(12) United States Patent
Zhang et al.

(10) Patent No.: US 11,968,667 B2
(45) Date of Patent: Apr. 23, 2024

(54) SIDELINK RESOURCE MULTIPLEXING AND INDICATION METHODS AND APPARATUSES THEREOF

(71) Applicant: FUJITSU LIMITED, Kawasaki (JP)

(72) Inventors: Jian Zhang, Beijing (CN); Pengyu Ji, Beijing (CN); Guorong Li, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 334 days.

(21) Appl. No.: 17/352,482

(22) Filed: Jun. 21, 2021

(65) Prior Publication Data

US 2021/0314933 A1    Oct. 7, 2021

Related U.S. Application Data

(63) Continuation of application No. PCT/CN2019/071196, filed on Jan. 10, 2019.

(51) Int. Cl.
*H04W 72/20* (2023.01)
*H04L 1/1607* (2023.01)
(Continued)

(52) U.S. Cl.
CPC ........... *H04W 72/20* (2023.01); *H04L 1/1607* (2013.01); *H04L 5/0048* (2013.01); *H04W 72/0446* (2013.01)

(58) Field of Classification Search
CPC . H04W 72/20; H04W 72/0446; H04W 92/18; H04W 4/30; H04W 4/40;
(Continued)

(56) References Cited

U.S. PATENT DOCUMENTS

2016/0044694 A1* 2/2016 Park ................... H04W 72/56
                                                            370/329
2019/0372647 A1    12/2019 Su et al.
(Continued)

FOREIGN PATENT DOCUMENTS

CN        103517275 A    1/2014
CN        108419295 A    8/2018
(Continued)

OTHER PUBLICATIONS

First Notification of Office Action and Search Report issued by the China National Intellectual Property Administration for corresponding Chinese Patent Application No. 201980081676.9, dated Mar. 10, 2023, with an English translation.
(Continued)

*Primary Examiner* — Dady Chery
(74) *Attorney, Agent, or Firm* — Myers Wolin, LLC

(57) ABSTRACT

Embodiments of this disclosure provide sidelink resource multiplexing and indication methods and apparatuses thereof. The method includes: receiving by a second device length information indicating a length of a first part in a slot transmitted by a terminal equipment or a network device; and performing transmission and/or reception of sidelink information by the second device with a first device according to the length information. Hence, the second device is able to process the first part according to the length information, thereby improving performance of sidelink transmission.

19 Claims, 20 Drawing Sheets

(51) Int. Cl.
*H04L 5/00* (2006.01)
*H04W 72/0446* (2023.01)

(58) Field of Classification Search
CPC ......... H04W 72/0453; H04W 72/1263; H04W 72/51; H04L 1/1607; H04L 5/0048; H04L 1/1864; H04L 5/001; H04L 5/0053; H04L 5/0055; H04L 2001/0093; H04L 5/0007
See application file for complete search history.

(56) References Cited

U.S. PATENT DOCUMENTS

2020/0007297 A1   1/2020  Hong et al.
2020/0196255 A1*  6/2020  Cheng ................... H04L 5/0064

FOREIGN PATENT DOCUMENTS

| WO | 2014/001902 A2 | 1/2014 |
| WO | 2018/131922 A1 | 7/2018 |
| WO | 2018/175528 A1 | 9/2018 |

OTHER PUBLICATIONS

Notice of Reasons for Refusal issued by the Japan Patent Office for corresponding Japanese Patent Application No. 2021-539035, dated Jul. 12, 2022, with an English translation.
Huawei et al., "Design and contents of PSCCH and PSFCH", Agenda Item: 7.2.4.1.5, 3GPP TSG-RAN WG1 Meeting #95, R1-1813554, Spokane, USA, Nov. 12-16, 2018.
Intel Corporation, "Physical Layer Procedures for NR V2X Sidelink Communication", Agenda Item: 7.2.4.1.2, 3GPP TSG-RAN WG1 Meeting #95, R1-1812489, Spokane, USA, Nov. 12-16, 2018.
Notice of Final Rejection issued by the Korean Intellectual Property Office for corresponding Korean Patent Application No. 10-2021-7020504, dated Feb. 9, 2023, with an English translation.
International Search Report and Written Opinions of the International Searching Authority issued by the China National Intellectual Property Administration for corresponding International Patent Application No. PCT/CN2019/071196, dated Sep. 27, 2019, with an English translation.
Samsung, "Discussion on physical layer structures for NR V2X", Agenda Item: 7.2.4.1.1, 3GPP TSG-RAN WG1 Meeting #95, R1-1813866, Spokane, USA, Nov. 12-16, 2018.
Examination Report issued by the Indian Patent Office for corresponding Indian patent application No. 202137027922 dated Mar. 4, 2022, with an English translation.
Notice of Preliminary Rejection by the Korean Intellectual Property Office issued for corresponding Korean Patent Application No. 10-2021-7020504, dated Aug. 1, 2022, with an English translation.
Extended European search report with the supplementary European search report and the European search opinion, issued by the European Patent Office for corresponding European Patent Application No. 19908260.3-1218, dated Dec. 8, 2021.
Mediatek Inc., Discussion on physical layer structure for NR sidelink, Agenda item: 7.2.4.1.1, 3GPP TSG-RAN WG1 Meeting #95, R1-1812364, Spokane, USA, Nov. 12-16, 2018.
Samsung, "Discussion on Physical Layer Procedures", Agenda item: 7.2.4.1.2, 3GPP TSG-RAN WG1 Meeting #95, R1-1812985, Spokane, USA, Nov. 12-16, 2018.
Hearing Notice issued by the Patent office of India for corresponding Indian patent application No. 202137027922, mailed on Feb. 6, 2024, with an English translation.

* cited by examiner

SIDELINK RESOURCE MULTIPLEXING AND INDICATION METHODS AND APPARATUSES THEREOF

CROSS-REFERENCE TO RELATED APPLICATION

This application is a continuation application of International Application PCT/CN2019/071196 filed on Jan. 10, 2019 and designated the U.S., the entire contents of which are incorporated herein by reference.

TECHNICAL FIELD

This disclosure relates to the field of communication technologies, and in particular to sidelink resource multiplexing and indication methods and apparatuses thereof.

BACKGROUND

Vehicle to Everything (V2X) is a vehicle communication technology that may realize information exchange between vehicles and vehicles, vehicles and roadside equipments, and vehicles and pedestrians. A transmission device in V2X may directly communicate with a reception device via a sidelink (SL). Different from a Uu link (an air interface between a network device and a user equipment) in a cellular network, the sidelink is a newly defined air interface for V2X (i.e. an air interface between V2X devices). The sidelink may use frequency resources of the cellular network Uu link, or may use dedicated frequency resources.

In sidelink transmission, control information may be transmitted via a physical sidelink control channel (PSCCH), and data information may be transmitted via a physical sidelink shared channel (PSSCH). Long term evolution (LTE) V2X only supports broadcast services, for example, a transmission device broadcasts road security information to surrounding reception devices, and the broadcast services need no introduction of feedback. Hence, LTE V2X provides no support for hybrid automatic repeat request (HARD) feedback and/or channel state information (CSI) feedback.

New Radio (NR) V2X is currently one of the research projects for Rel-16 standardization. Compared with LTE V2X, NR V2X needs to support many new scenarios and new services (such as remote driving, autonomous driving, and fleet driving), and it needs to meet higher technical indices (such as high reliability, low latency, and high data rate, etc.). In order to meet demands of different scenarios and different services, NR V2X needs to provide support for unicast and groupcast, in addition to broadcast.

Different from broadcast, HARQ feedback and/or CSI feedback is/are of great significance to unicast and multicast. A transmission device may decide whether to schedule retransmission based on an HARQ feedback result, so as to avoid waste of resources caused by blind retransmission. And the transmission device may also perform link adaptation based on CSI measurement and feedback result, such as selecting a modulation and coding scheme (MCS), precoding matrix indicator (PMI), a beam, or a rank, etc., that best suit a current channel, which is conducive to realization of transmission at a high data rate.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

It was found by the inventors that at present, NR V2X defines a new physical channel, called a physical sidelink feedback channel (PSFCH), which is used to carry HARQ feedback information and/or CSI (hereinafter collectively referred to as feedback information). The PSFCH may not occupy entire slot in the time domain, and the number of symbols occupied by the PSFCH (i.e. a length of the PSFCH) may vary with overhead of feedback information.

Therefore, the PSFCH will bring rapid changes in interference or signal strength in units of less than a time length of a slot, which will have effect on a PSCCH and PSSCH multiplexed with the PSFCH, including reduction of accuracy of estimation of automatic gain control (AGC) or increase of complexity of AGC estimation, collision of a symbol where a demodulation reference signal (DM-RS) is located with an AGC symbol, thereby resulting in degradation of performance of channel estimation, and a rapid change of transmitting power in a slot, thereby increasing complexity of power control and adjustment. The above problems need to be solved in multiplexing of the PSFCH, PSCCH and PSSCH in NR V2X.

Addressed to at least one of the above problems, embodiments of this disclosure provide sidelink resource multiplexing and indication methods and apparatuses thereof.

According to a first aspect of the embodiments of this disclosure, there is provided a sidelink resource multiplexing method, including:
  performing, by a terminal device, transmission and/or reception of physical sidelink feedback channel (PSFCH), and performing transmission and/or reception of physical sidelink control channel (PSCCH) and/or physical sidelink shared channel (PSSCH);
  multiplexing PSFCH and PSCCH/PSSCH in a predefined time division multiplexing (TDM) manner.

According to a second aspect of the embodiments of this disclosure, there is provided a sidelink resource multiplexing apparatus, including:
  a memory that stores a plurality of instructions; and
  a processor coupled to the memory and configured to execute the instructions to: perform transmission and/or reception of physical sidelink feedback channel (PSFCH), and perform transmission and/or reception of physical sidelink control channel (PSCCH) and/or physical sidelink shared channel (PSSCH);
  multiplex PSFCH and PSCCH/PSSCH in a predefined time division multiplexing (TDM) manner.

According to a third aspect of the embodiments of this disclosure, there is provided a communication system, including:
  a terminal device configured to perform transmission and/or reception of physical sidelink feedback channel (PSFCH), and perform transmission and/or reception of physical sidelink control channel (PSCCH) and/or physical sidelink shared channel (PSSCH); multiplex PSFCH and PSCCH/PSSCH in a predefined time division multiplexing (TDM) manner.

An advantage of the embodiments of this disclosure exists in that PSFCH and PSCCH/PSSCH are multiplexed by the terminal device in a predefined time division multiplexing (TDM) manner, thereby improving performance of sidelink transmission (such as increasing accuracy of AGC estimation).

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION OF THE DISCLOSURE

Figure 1:
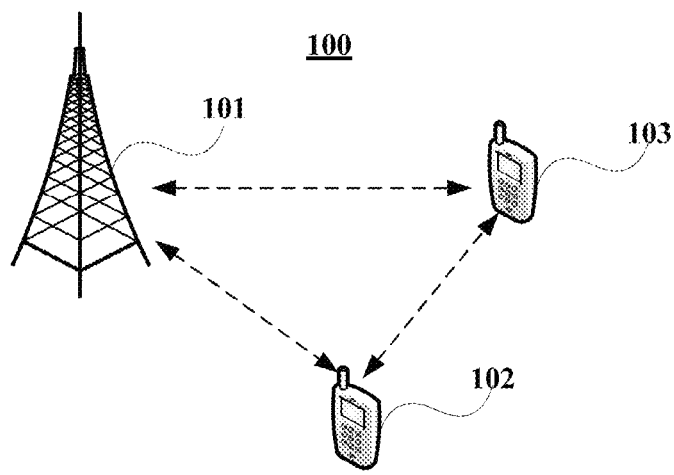
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network"

may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, a communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiment of this disclosure, existing traffics or traffics that may be implemented in the future may be performed between the network device 101 and the terminal equipments 102, 103. For example, such traffics may include but not limited to an enhanced mobile broadband (eMBB), massive machine type communication (MTC), and ultra-reliable and low-latency communication (URLLC), etc.

It should be noted that FIG. 1 shows that two terminal equipments 102, 103 are both within a coverage of the network device 101. However, this disclosure is not limited thereto, and the two terminal equipments 102, 103 may not be within the coverage of the network device 101, or one terminal equipment 102 is within the coverage of the network device 101 and the other terminal equipment 103 is outside the coverage of the network device 101.

In the embodiments of this disclosure, sidelink transmission may be performed between two terminal equipments 102, 103. For example, the two terminal equipments 102, 103 may both perform sidelink transmission within the coverage of the network device 101 to implement V2X communications, or both of them may perform sidelink transmission outside the coverage of the network device 101 to implement V2X communications, and it may also be that one terminal equipment 102 is within the coverage of the network device 101 and another terminal equipment 103 is outside the coverage of the network device 101 and perform sidelink transmission to implement V2X communications.

The embodiments of this disclosure shall be described by taking a sidelink and V2X as examples; however, this disclosure is not limited thereto.

Embodiment 1

The embodiments of this disclosure provide a sidelink resource multiplexing method, which shall be described from a second device. The second device performs sidelink communication with a first device. The first device and/or the second device may be a terminal equipment/terminal equipments; however, this disclosure is not limited thereto; for example, it/they may also be a roadside device/roadside devices or a network device/network devices. Following description shall be given by taking that the first device and the second device are both terminal equipments as an example.

Figure 2:
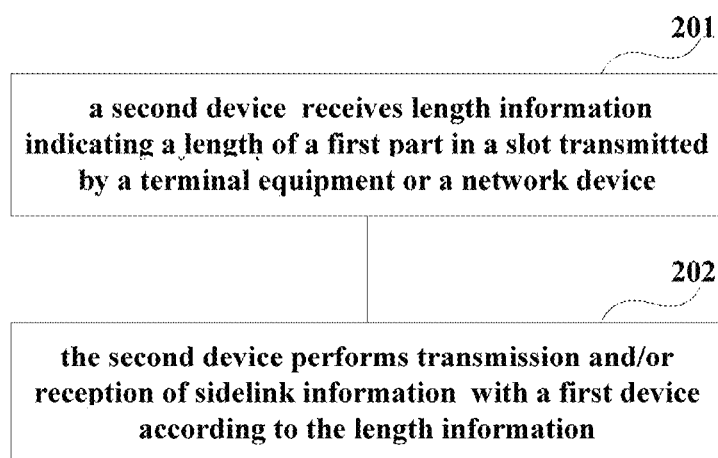
FIG. 2 is a schematic diagram of the sidelink resource multiplexing method of an embodiment of this disclosure.

FIG. 2 is a schematic diagram of the sidelink resource multiplexing method of the embodiment of this disclosure. As shown in FIG. 2, the method includes:
  step 201: a second device receives length information indicating a length of a first part in a slot transmitted by a terminal equipment or a network device; and
  step 202: the second device performs transmission and/or reception of sidelink information with a first device according to the length information.

In an embodiment, the second device may perform automatic gain control on the first part according to the length information; however, this disclosure is not limited thereto, for example, other processing may be performed according to the length information.

It should be noted that FIG. 2 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 2.

In an embodiment, the length information may include at least one of the following: a length of a physical sidelink feedback channel, a slot length to which a numerology corresponds, or a length of a mini-slot; however, this disclosure is not limited thereto.

In an embodiment, the sidelink information may include information carried by at least one of the following channels: a physical sidelink control channel (PSCCH), a physical sidelink shared channel (PSSCH), or a physical sidelink feedback channel (PSFCH).

In an embodiment, one or more symbols preceding the first part in the slot carries/carry information for AGC, and one or more symbols preceding the first part in the slot is/are taken as a guard interval/guard intervals. The slot may further include at least one second part, and one or more symbols preceding the second part in the slot carries/carry information for AGC and/or is/are taken as a guard interval/guard intervals. For example, the first part may be a PSFCH, and the second part may be a PSCCH and/or a PSSCH.

Figure 3:
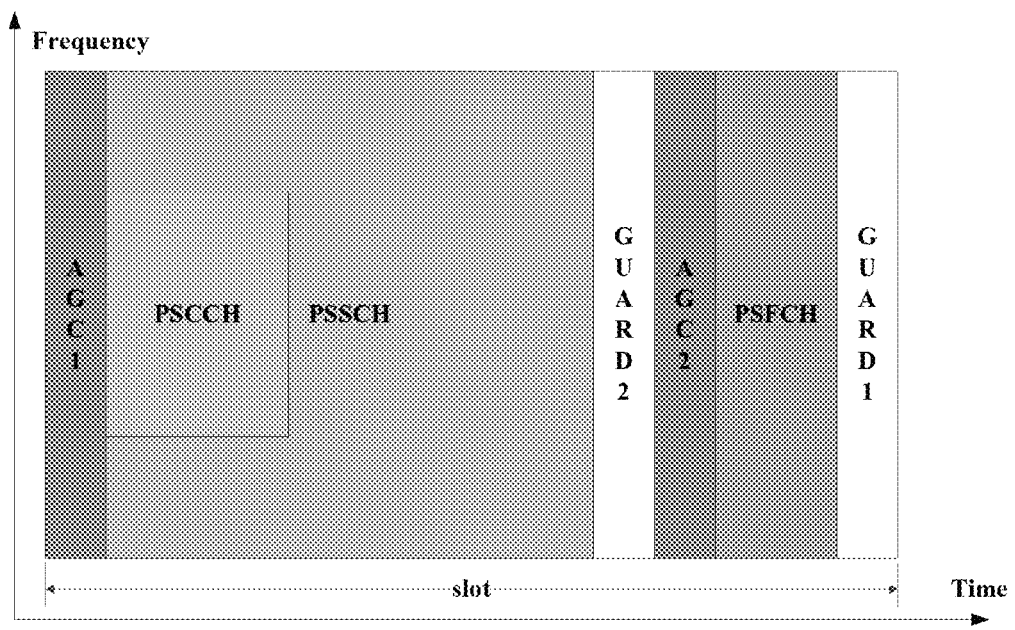
FIG. 3 is a schematic diagram of sidelink resources of the embodiment of this disclosure.

FIG. 3 is a schematic diagram of sidelink resources of the embodiment of this disclosure, giving an example of multiplexing the PSCCH, PSSCH and PSFCH in a slot. This multiplexing mode is conducive to meeting low-latency service demands. For example, UE 1 may receive the PSCCH and PSSCH from UE 2 in this slot, and transmit HARQ feedback information to UE 2 via the PSFCH in the same slot. As the PSCCH and PSSCH are transmitted by UE 2 and the PSFCH is transmitted by UE 1, it is necessary to perform AGC estimation separately.

For example, as shown in FIG. 3, an AGC 1 symbol is used for AGC estimation of the PSCCH and PSSCH, and an AGC 2 symbol is used for AGC estimation of the PSFCH. A GUARD 2 symbol is used as a guard interval for reception/transmission conversion between the PSCCH/PSSCH and the PSFCH, and a GUARD 1 symbol is used as a guard interval for reception/transmission conversion between slots. The AGC and GUARD in FIG. 3 are located in different symbols. A slot structure shown in FIG. 3 is not limited to a scenario that supports a device to receive data information and transmit HARQ feedback information in the same slot.

For example, in a slot, UE 1 only needs to transmit feedback information to UE 2 via the PSFCH, and UE 3 only needs to transmit data information to UE 4 via the PSCCH/PSSCH, hence, UE 1 and UE 3 may perform multiplexing of the PSFCH and the PSCCH/PSSCH in a manner shown in FIG. 3.

For another example, in a slot, UE 5 needs to transmit data information to UE 6, and needs to transmit feedback information to UE 7, then the PSCCH/PSSCH and PSFCH transmitted to UE 6 and UE 7 may be multiplexed in a slot in the manner shown in FIG. 3. Hence, the PSCCH, PSSCH and PSFCH transmitted by different devices or transmitted to different devices may all be multiplexed in the same slot, thereby improving spectrum utilization.

As a processing capacity of a device increases, it is also possible to complete reception/transmission conversion and AGC estimation within one symbol, that is, GUARD and AGC in FIG. 3 may be located within one symbol.

Figure 4:
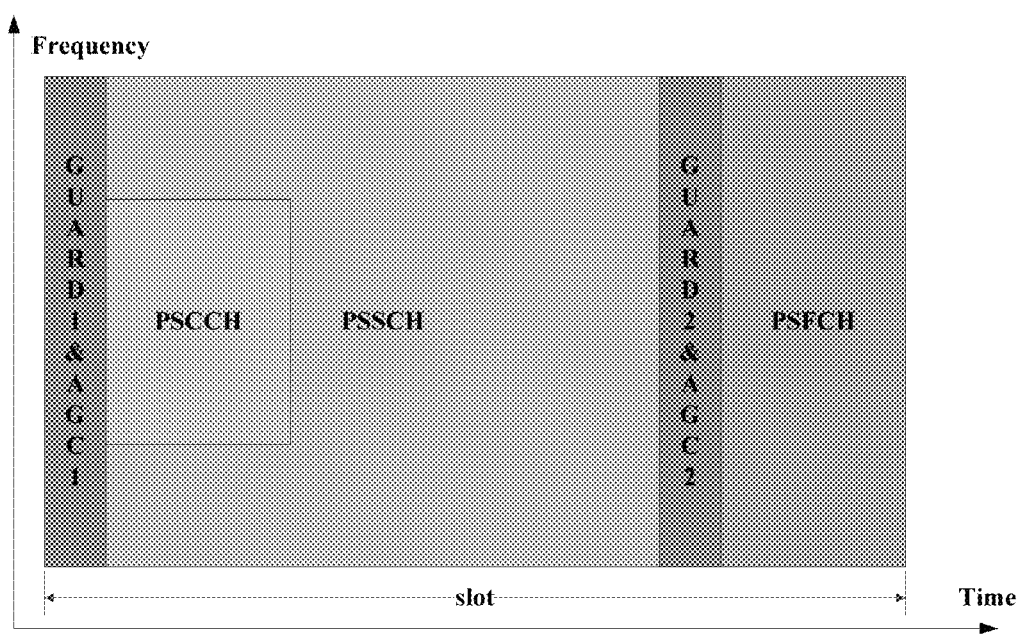
FIG. 4 is another schematic diagram of sidelink resources of the embodiment of this disclosure.

FIG. 4 is another schematic diagram of sidelink resources of the embodiment of this disclosure, giving an example in this case. GUARD 1 and AGC 1 are located in a first symbol of a slot, and not only reception/transmission conversion between slots but also AGC estimation of the PSCCH and PSSCH may be performed within a time of a symbol. GUARD 2 and AGC 2 are located in a former symbol of the PSFCH, and not only reception/transmission conversion between PSCCH/PSSCH and PSFCH but also AGC estimation of the PSFCH may be performed within a time of a symbol.

For the sake of simplicity, FIG. 3 and FIG. 4 can be uniformly abstracted.

Figure 5:
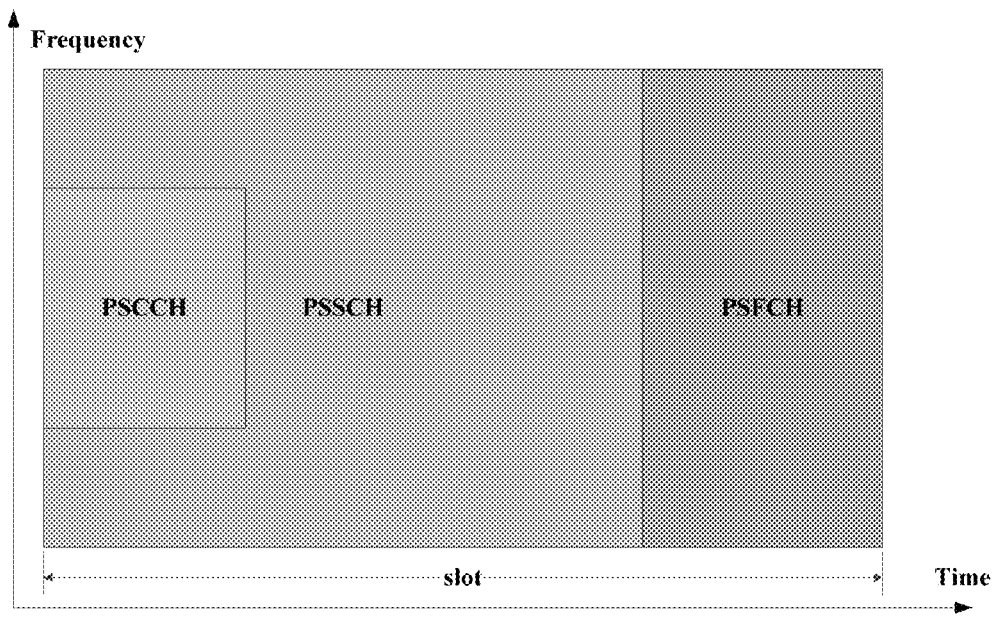
FIG. 5 is a further schematic diagram of sidelink resources of the embodiment of this disclosure.

FIG. 5 is a further schematic diagram of sidelink resources of the embodiment of this disclosure, in which the AGC symbol and guard interval are omitted. Actually, the AGC and GUARD structures in FIG. 5 may follow either one of the structures shown FIG. 3 and FIG. 4. In addition, relative positions of the PSCCH/PSSCH and PSFCH in frequency are not limited in FIG. 5, that is, the PSCCH/PSSCH and PSFCH may be completely overlapped, partially overlapped, or completely non-overlapped in frequency.

Figure 6:
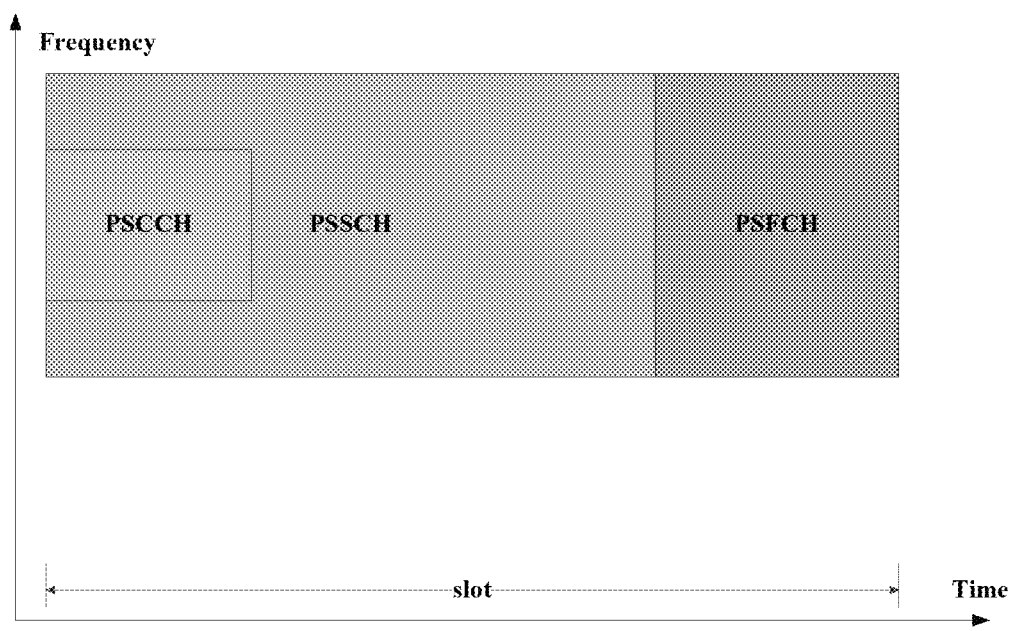
FIG. 6 is yet another schematic diagram of sidelink resources of the embodiment of this disclosure.
Figure 7:
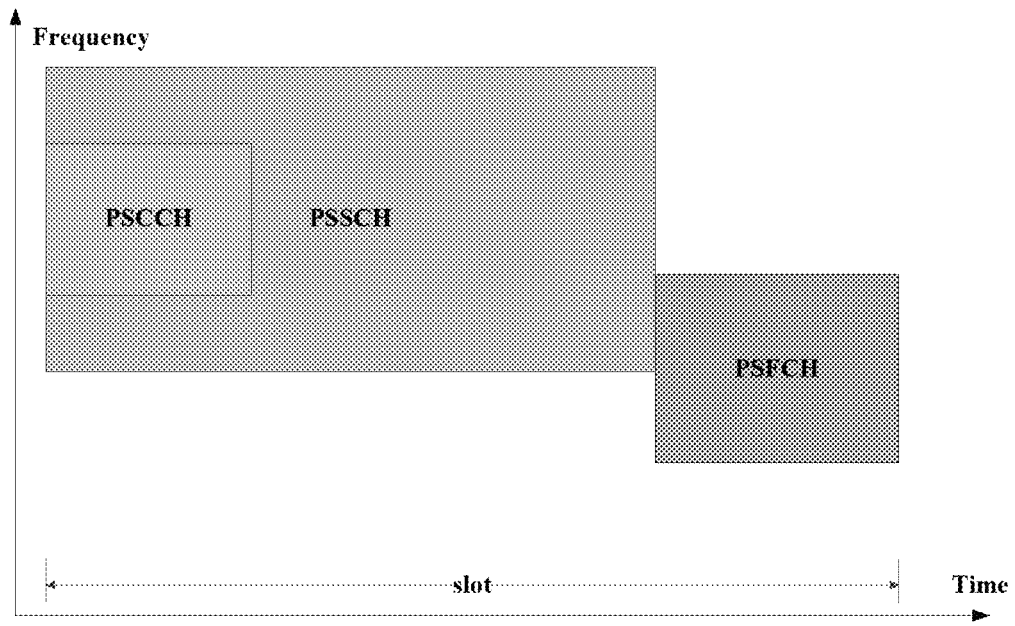
FIG. 7 is still another schematic diagram of sidelink resources of the embodiment of this disclosure.
Figure 8:
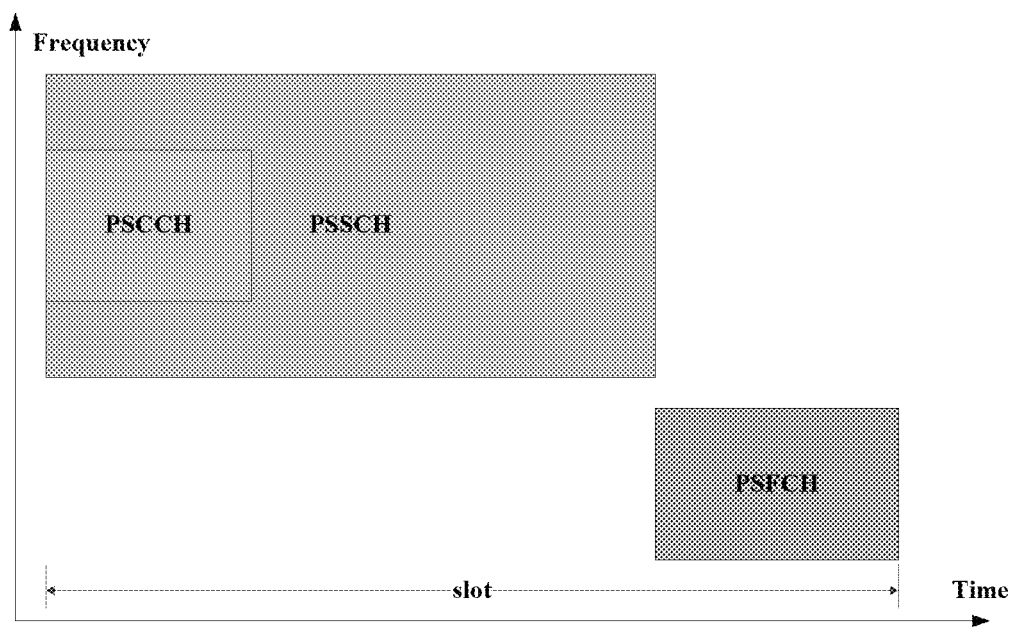
FIG. 8 is yet still another schematic diagram of sidelink resources of the embodiment of this disclosure.

FIG. 6 is another schematic diagram of sidelink resources according to an embodiment of this disclosure, showing the where the PSCCH/PSSCH and PSFCH are completely overlapped in frequency, and FIG. 7 is still another schematic diagram of sidelink resources of the embodiment of this disclosure, showing the where the PSCCH/PSSCH and PSFCH are partially overlapped in frequency, and FIG. 8 is yet still another schematic diagram of sidelink resources of the embodiment of this disclosure, showing the where the PSCCH/PSSCH and PSFCH are completely non-overlapped in frequency.

In NR Rel-15, feedback information of a Uu interface is transmitted to a network device (such as a base station) via a physical uplink control channel (PUCCH), and the number of symbols used by the PUCCH (i.e. a length of the PUCCH) is variable. For example, the terminal equipment may flexibly select an appropriate PUCCH length according to a load of the feedback information.

"Length" in this text generally refers to a length of time, which may be, for example, measured by the number of symbols. The embodiments of this disclosure may use such waveforms as orthogonal frequency division multiplex (OFDM), single-carrier frequency division multiple access (SC-FDMA), or discrete Fourier transform spread orthogonal frequency division multiplex (DFT-s-OFDM), etc. Hence, the above symbols may be OFDM symbols, SC-FDMA symbols or DFT-s-OFDM symbols, etc., which are hereinafter referred to as symbols; however, this disclosure is not limited thereto.

If NR V2X follows the idea of the PUCCH, allowing the device to flexibly select the number of symbols (i.e. a length of the PSFCH) used by the PSFCH, it will cause a problem of inaccurate AGC estimation. In particular, the flexible PSFCH length means that different devices may use different PSFCH lengths. These PSFCHs of different lengths will cause signals and/or interference strengths of other devices performing data reception to change within a slot. And as the reception device does not have an ability to grasp global information like a base station and does not know information on other devices performing multiplexing with it, the reception device will not be able to perform AGC estimation accurately, causing reduction of reliability of information transmission.

For NR Rel-15, a terminal equipment only needs to know PUCCH length information of its own, and for NR V2X, it is necessary for a terminal equipment to know PSFCH lengths of other terminal equipments. This shall be explained below by analyzing influence of interference changes on AGC.

Figure 9:
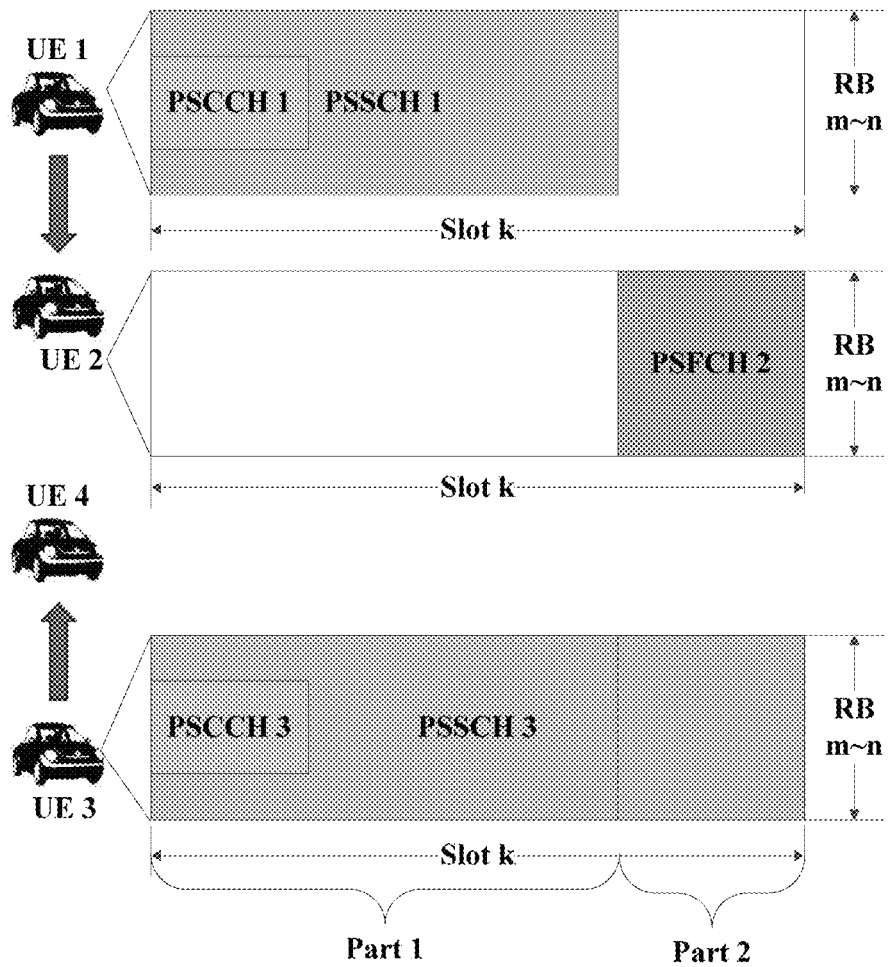
FIG. 9 is a schematic diagram of performing sidelink resource multiplexing by multiple devices of the embodiment of this disclosure.

FIG. 9 is a schematic diagram of performing sidelink resource multiplexing by multiple devices of the embodiment of this disclosure. As shown in FIG. 9, for example, UE 1 transmits PSCCH 1 and PSSCH 1 to UE 2, and UE 2 transmits HARQ-ACK feedback information to UE 1 via PSFCH 2 in the same slot. As V2X devices may be multiplexed in a group of overlapped time-frequency resources (sharing the same group of time-frequency resources, or performing frequency reuse), UE 3 may transmit PSCCH 3 and PSSCH 3 to UE 4 in the same time-frequency resource as UE 1 and UE 2, for example, UE 3 deems by sensing that the entire slot may be used for transmitting information. It is not necessary to exchange feedback information between UE 3 and UE 4, that is, there may exist no PSFCH. As a reception device, UE 4 is interfered in part 1 of slot k by PSCCH 1/PSSCH 1 transmitted by UE 1, and is interfered in part 2 of slot k by PSFCH 2 transmitted by UE 2. The interferences at these two parts are independent of each other, and intensities of the interferences may vary significantly.

For example, UE 1-UE 4 are driving in the same direction in a lane. As UE 2 is close to UE 4, part 2 of UE 4 is subject to relatively strong interference. And as UE 1 and UE 4 are blocked by UE 2 therebetween, part 1 of UE 4 is subject to relatively small interference. Although UE 3 will perceive before transmitting information, as it is far away from UE 4, it is unable to accurately perceive an interference environment of UE 4, that is, a problem of hidden node. Or, UE 3 may determine that the slot is available by sensing at the beginning of the slot, however, as it is unable to predict that there will be strong interference in part 2 of the slot, UE 3 may still transmit information at this slot.

If a conventional method is used to perform AGC estimation based on a first symbol in the slot and a result is applied to the entire slot, in the above case, the conventional method will cause the AGC estimation of part 2 to be inaccurate, thereby resulting in failure of data solution in the entire slot.

To solve this problem, AGC estimation needs to be performed on part 1 and part 2 of UE 4 independently. UE 4 itself may not need to transmit feedback information, that is, it does not need to know such PSFCH resource configuration information as PSFCH length, etc., but in order to be able to perform independent AGC estimation on part 1 and part 2 in the slot, UE 4 at least needs to know PSFCH length information of other devices causing interference to it.

Figure 10:
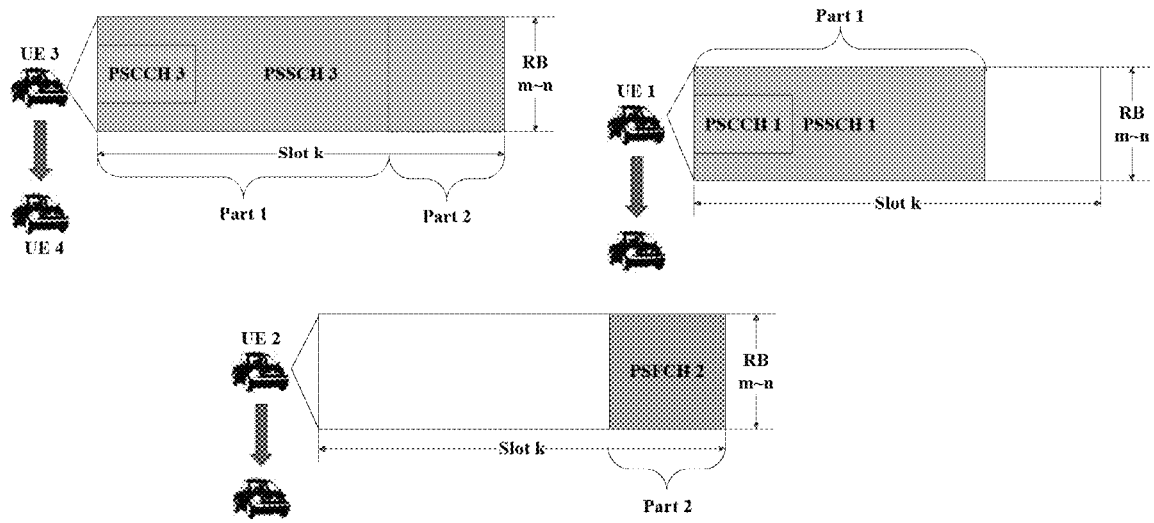
FIG. 10 is another schematic diagram of performing sidelink resource multiplexing by multiple devices of the embodiment of this disclosure.

FIG. 10 is another schematic diagram of performing sidelink resource multiplexing by multiple devices of the embodiment of this disclosure. As shown in FIG. 10, UE 3 uses the entire slot to transmit PSCCH 3 and PSSCH 3 to UE 4. As different devices may be multiplexed in a group of overlapped time-frequency resources, other UEs may transmit and receive data within the same time-frequency resource range (RB m to RB n, slot k).

For example, UE 2 transmits such feedback information as HARQ feedback and/or CSI, etc., via PSFCH 2 within RB m to RB n and part 2 of slot k, and UE 1 may know that there exists a PSFCH to be transmitted in the frequency domain within RB m to RB n and part 2 of slot k by sensing or by demodulating sidelink control information (SCI), hence, UE 1 may transmit PSCCH 1 and PSSCH 1 at part 1 of slot k.

For the reception of UE 4, it is subject to interference from different devices of UE 1 and UE 2 at part 1 and part 2 of slot k, respectively, hence, AGC estimation needs to be performed on part 1 and part 2 independently. Although UE 4 itself may not need to transmit feedback information, in order to be able to perform independent AGC estimation on part 1 and part 2 in the slot, UE 4 at least needs to know PSFCH length information of other devices causing interference to it.

Figure 11:
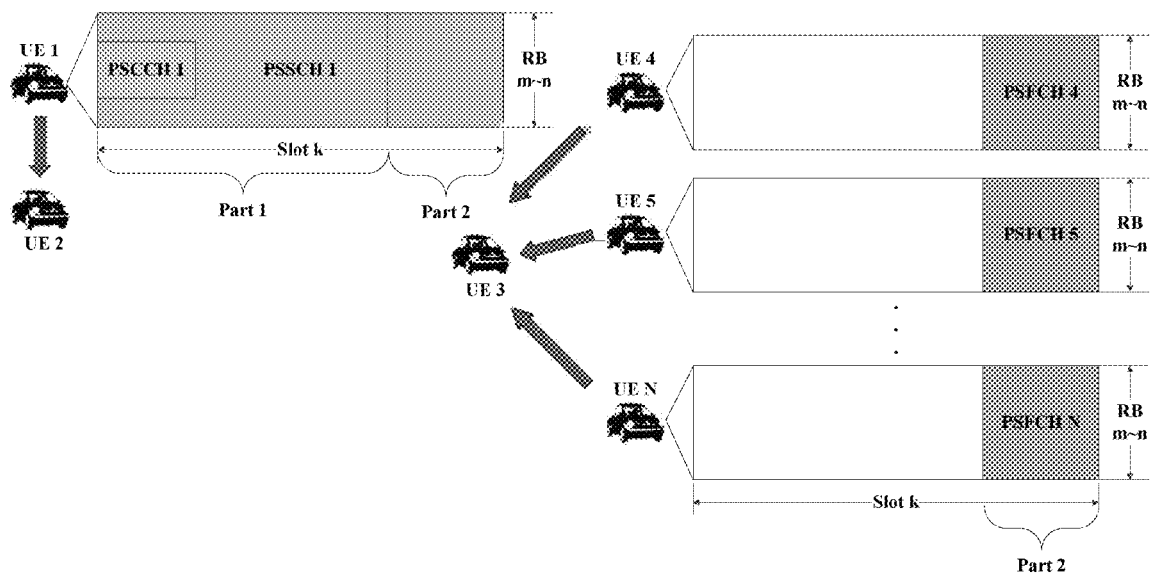
FIG. 11 is a further schematic diagram of performing sidelink resource multiplexing by multiple devices of the embodiment of this disclosure.

FIG. 11 is a further schematic diagram of performing sidelink resource multiplexing by multiple devices of the embodiment of this disclosure. As shown in FIG. 11, UE 1 uses the entire slot to transmit PSCCH 1 and PSSCH 1 to UE 2, and what are multiplexed with it in a group of overlapped time-frequency resources are a group of V2X devices performing groupcast communication, that is, within RB m to RB n, UE 3 transmits information to a group of devices from UE 4 to UE N in a multicast manner.

For groupcast HARQ feedback, multiple devices transmit HARQ feedback information by using identical PSFCH resources is a method that is able to efficiently use resources, which may avoid allocating dedicated PSFCH resources to each device, thereby greatly saving feedback resource overhead, and these devices may feed back NACK only and not feed back ACK. When multiple devices transmit NACK by using identical resources, superimposed signals will produce a signal enhancement effect, which is conducive to reliable reception of feedback information.

However, while the above method enhances the feedback signals, it also enhances interference to other devices. For example, as shown in FIG. 11, UE 4 to UE N receive groupcast data at a slot before slot k and transmit NACK at part 2 of slot k. Due to superposition of signals of multiple UEs, greater interference to part 2 of slot k may possibly produce, intensities of the interferences to part 1 and part 2 of UE 2 change significantly. Therefore, AGC estimation needs to be performed on part 1 and part 2 independently.

Here, due to hidden nodes, etc., UE 1 may not be able to learn existence of multicast feedback by blindly detecting SCI of UE 3 or by sensing, etc., hence, it may not be avoided to schedule UE 2 on identical time-frequency resources to receive data. Although UE 2 may not need to transmit feedback information by itself, in order to be able to perform independent AGC estimation on part 1 and part 2 in the slot, UE 2 at least needs to know PSFCH length information of other devices causing interference to it.

It can be seen from above that the reception device at least needs to know the PSFCH length information of other devices. As it is possible that multiple devices are multiplexed with a reception device in a group of overlapped time-frequency resources, knowing PSFCH information of multiple devices by the reception device will bring about relatively large signaling overhead. And furthermore, flexible selecting the PSFCH lengths by multiple devices will also increase AGC symbol overhead and/or complexity of AGC estimation of the reception device.

Figure 12:
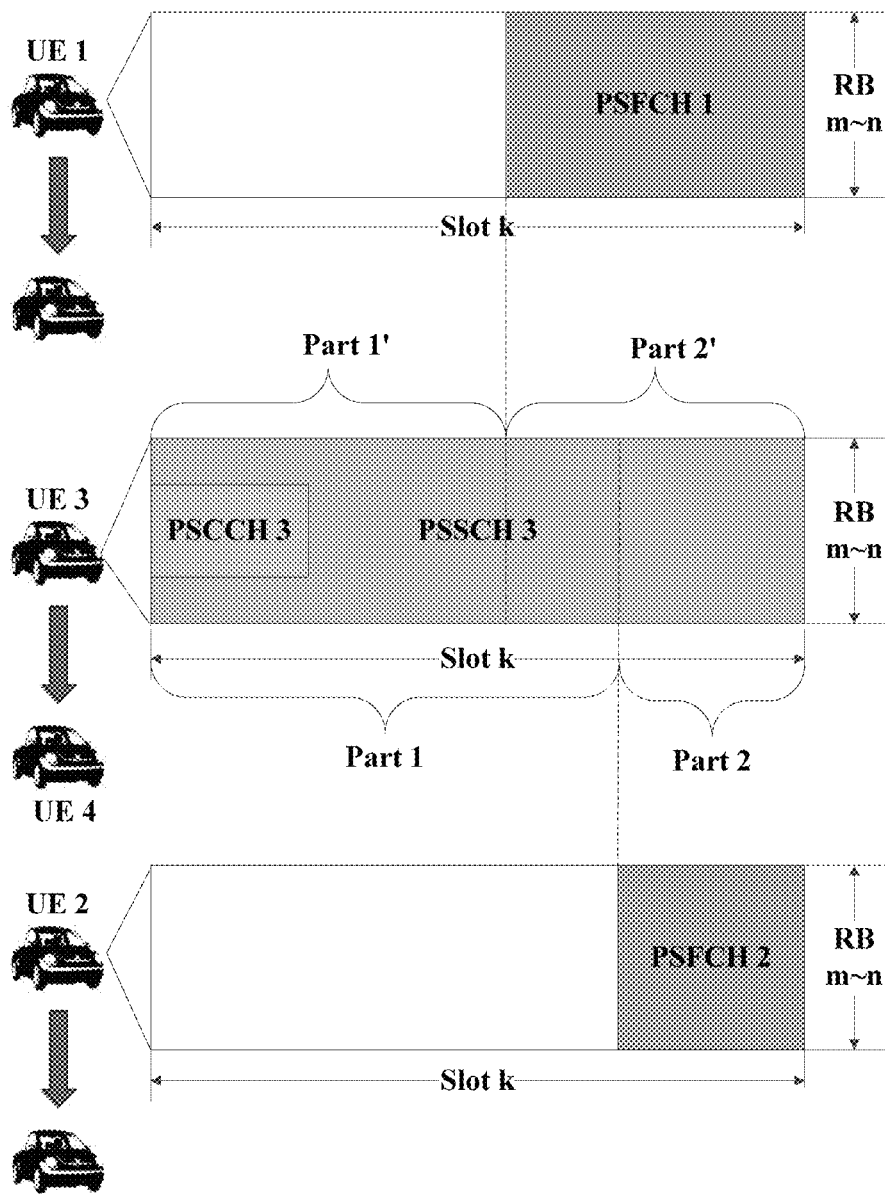
FIG. 12 is yet another schematic diagram of performing sidelink resource multiplexing by multiple devices of the embodiment of this disclosure.

FIG. 12 is yet another schematic diagram of performing sidelink resource multiplexing by multiple devices of the embodiment of this disclosure. As shown in FIG. 12, when multiple devices (UE 1, UE 2, etc.) have different PSFCH lengths, multiple part lengths (such as part 2, part 2') will be formed at a reception device (UE 4), hence, UE 4 will be subjected to multiple interferences of different degrees in a slot (interferences to which part 1', part 2 and the rest in the slot in FIG. 12 are subjected are different), and multiple times of independent AGC estimation need to be performed, which requires larger AGC symbol overhead and/or higher complexity of AGC estimation.

FIGS. 9-12 are given schematically as examples only. For simplicity, it is assumed FIGS. 9-12 that the number of resource blocks (RBs) occupied by the PSCCH/PSSCH interfered by the PSFCH is identical to the number of RBs occupied the PSFCH as an interference source. Actually, the two numbers of RBs may also be different, as long as there exist overlapped RBs in the frequency domain, the above analysis of interference and the influence on AGC are still valid, which shall not be enumerated herein one by one.

For the sake of simplicity, FIGS. 9-12 can be uniformly abstracted.

Figure 13:
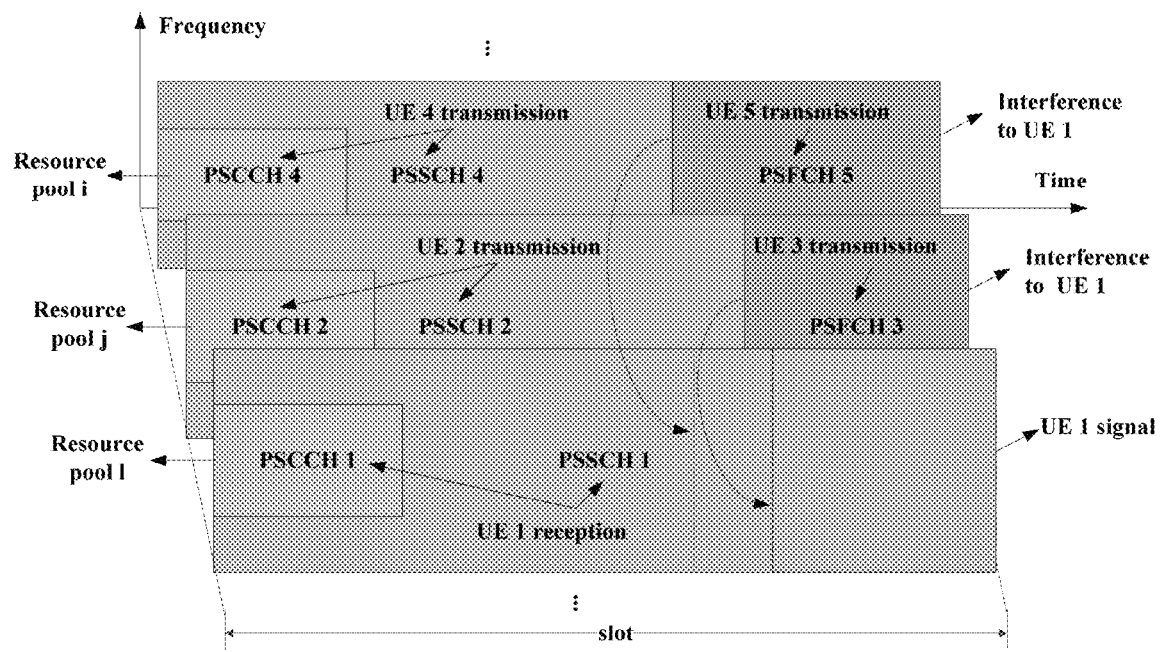
FIG. 13 is still another schematic diagram of performing sidelink resource multiplexing by multiple devices of the embodiment of this disclosure.

FIG. 13 is still another schematic diagram of performing sidelink resource multiplexing by multiple devices of the embodiment of this disclosure. As shown in FIG. 13, for PSCCH 1 and PSSCH 1 that a device wants to receive in a slot, there may exist information transmission and reception between other devices in time-frequency resources that coincide with them (not necessarily completely coincident). For example, information carried by such physical channels as PSCCH 2/PSSCH 2, PSFCH 3, PSCCH 4/PSSCH 4, and PSFCH 5, etc., may come from different devices, and interference of PSCCH 1/PSSCH 1 in a slot will change, hence, the conventional method for performing AGC estimation based on only a first symbol in a slot is no longer applicable, and a reception device of PSCCH 1/PSSCH 1 needs to perform multiple times of AGC estimation in a slot.

Figure 14:
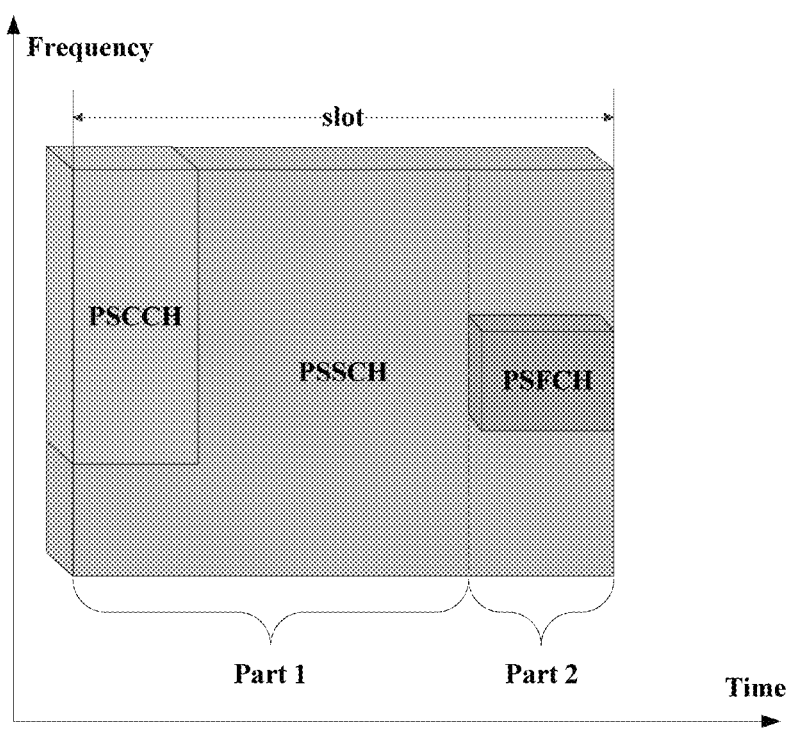
FIG. 14 is further still another schematic diagram of sidelink resources of the embodiment of this disclosure.

FIG. 14 is further still another schematic diagram of sidelink resources of the embodiment of this disclosure. For example, as shown in FIG. 14, the PSSCH uses more RBs to transmit a transport block (TB) of a larger size, but is subject to strong narrowband interference from the PSFCH at part 2 of the slot. If AGC estimation is performed based only on a first symbol in the slot, a PSSCH demodulation and decoding performance of part 2 will be affected, which in turn affects a demodulation and decoding performance of the TB in the entire slot.

The change of the interference in the slot is a reason that leads to multiple times of AGC estimation, and another reason may be a change of signal energy (or power).

Figure 15:
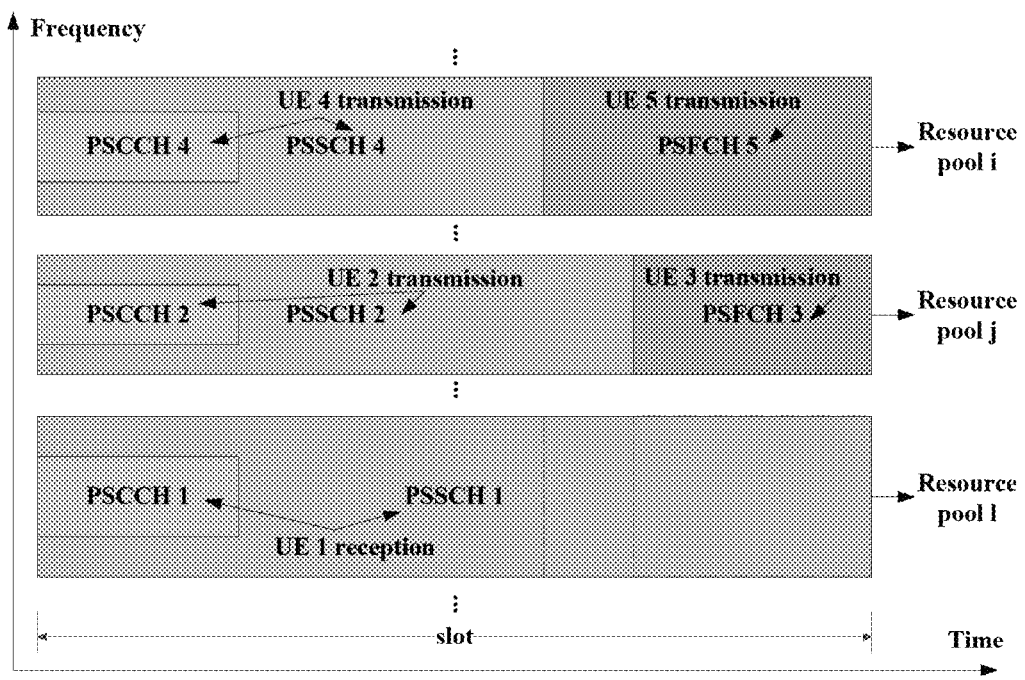
FIG. 15 is yet still another schematic diagram of performing sidelink resource multiplexing by multiple devices of the embodiment of this disclosure.

FIG. 15 is yet still another schematic diagram of performing sidelink resource multiplexing by multiple devices of the embodiment of this disclosure. As shown in FIG. 15, PSCCH 1/PSSCH 1 and physical channels or signals of other devices (such as PSCCH 2/PSSCH 2, PSFCH 3, PSCCH 4/PSSCH 4, or PSFCH 5, etc., the number of RBs occupied by these physical channels being able to be different) are multiplexed in the frequency domain in a frequency division multiplexing manner, and all of these physical channels fall within a receiving frequency range of the reception device of PSCCH 1/PSSCH 1 (such as within a BWP of the reception device).

The signal energy received by the reception device in the slot is a sum of all energies of all frequency division multiplexed physical channels and/or signals. As signals from different devices exist in the slot, energies of the time-domain signals received by the reception device of PSCCH 1/PSSCH 1 will change in the slot, hence, the conventional method for performing AGC estimation based on only a first symbol in a slot is no longer applicable, and the reception device of PSCCH 1/PSSCH 1 needs to perform multiple times of AGC estimation in a slot. The scenarios in FIGS. 9-12 may be easily extended to the frequency division multiplexing scenario shown in FIG. 15 to illustrate the changes of signal energies in the slot, which shall not be enumerated herein one by one.

With the above analysis, even if the device only needs to receive the PSCCH and PSSCH like in LTE V2X, or even if the device itself does not need to use the PSFCH to transmit information, as the PSFCH is introduced into NR V2X, based on the previously analyzed influence of PSFCH on AGC, it is still necessary that the device performs multiple times of AGC estimation in a slot. In order to perform multiple times of AGC estimation, the device needs to know PSFCH length information of other devices. In order not to perform too many times of AGC estimation, the other devices may be restricted to have identical PSFCH lengths. When this condition is met, the device may perform only two times of AGC estimation in a slot.

In an embodiment, when there exist at least two first part lengths within a time range overlapping with the slot in time, the at least two first part lengths are configured to be identical.

For example, for devices using identical time-frequency resources (such as bandwidth parts (BWPs), resource pools, and carriers, etc.), if the PSFCHs need to be transmitted, the PSFCHs of these devices may be restricted to have identical PSFCH lengths. Hence, the reception device may perform AGC estimation at a determined position according to the PSFCH lengths, and two times of AGC estimation is only performed in a slot.

In an embodiment, the length information may be configured by at least one of the following: radio resource control (RRC) signaling, system information (SI), sidelink control information (SCI), or downlink control information (DCI).

For example, the SCI may be used to inform the PSFCH length. A cyclic redundancy check (CRC) code of the SCI may be scrambled by using a common identifier. The SCI may indicate at least one of the following: the length of the PSFCH, a slot where the PSFCH is located, a symbol where the PSFCH is located, a resource block where the PSFCH is located, a slot where the PSSCH is located, a symbol where the PSSCH is located, or a resource block where the PSSCH is located.

For example, UE 1 transmits the SCI to UE 2, and the CRC of the SCI is scrambled with a common identifier (such as a public ID or a public RNTI), the common identifier being able to be a group-common ID or RNTI. The SCI indicates a slot at which UE 2 transmits such HARQ feedback and/or CSI as information, and a field of the SCI is used to indicate the PSFCH length. In one implementation, higher-layer signaling (such as RRC signaling) may be used to configure a number of available PSFCH lengths, and the SCI indicates which PSFCH length is actually used, hence, UE 2 knows at which slot and how many symbols are used to transmit the PSFCH.

The PSFCH length is directly indicated in the SCI above, and the PSFCH length may also be indicated by indicating a PSFCH time-frequency resource. For example, the SCI indicates the slot where PSFCH is located, a symbol where PSFCH is located and an RB where the PSFCH is located, so that the UE 2 may also obtain PSFCH length information therefrom. In addition, as the CRC of above SCI is scrambled with the common identifier, other devices than UE 2 may also demodulate the SCI to obtain the PSFCH length and information on the slot where the PSFCH is located, and perform additional AGC estimation based on the information in the slot where the PSFCH is present.

The following scenario is taken into account, in which the PSFCH transmitted by UE 2 will be multiplexed with the PSSCH received by UE 3, thereby affecting the AGC of UE 3. However, as UE 3 may also demodulate the above SCI carrying the PSFCH information, UE 3 may also obtain the PSFCH length information, hence, UE 3 may perform additional AGC estimation based on the PSFCH length information.

Moreover, indicating the PSFCH length by the SCI is also flexible enough to configure multiple PSFCHs transmitted in the same slot to have identical lengths. For example, SCI 1 transmitted by UE 1 to UE 2 instructs UE 2 to transmit PSFCH 1 at slot k, and SCI 2 transmitted by UE 3 to UE 4 instructs UE 4 to transmit PSFCH 2 at slot k, then SCI 1 and SCI 2 may indicate identical PSFCH lengths. For UE 5 that is multiplexed with PSFCH 1 and PSFCH 2 in slot k, it may avoid performing multiple times of AGC estimation in receiving the multiplexed PSSCH. In this example, UE 5 needs to perform AGC estimation twice only.

For example, this method may be used in 2-stage SCI. The 2-stage SCI divides information carried by one piece of SCI originally transmitted to UE 1 into two parts, which are carried by two pieces of SCI. For example, SCI 1 may not only carry any of the above information indicating the lengths of the PSFCHs, but also the information on the time-frequency resources where the PSSCHs are located (such as the slot where PSFCH is located, the symbol where PSFCH is located and the RB where the PSFCH is located), and the CRC of SCI 1 is scrambled with a common identifier; SCI 2 carries an MCS and other information used for demodulation and decoding, and the CRC of SCI 2 is scrambled with a UE-specific identifier (such as a C-RNTI).

Due to the scrambling with the common identifier, SCI 1 may be received by UE 2, hence, UE 2 may avoid the PSFCH and/or PSSCH resources indicated by SCI 1 to avoid interference; and UE 1 may receive two pieces of SCI to achieve complete data information reception and demodulation. As the information on the PSFCH length and the slot where the PSFCH is located is carried in the SCI 1, after UE 2 receives SCI 1, it may also perform additional AGC estimation based on the PSFCH length information in the slot where the PSFCH is present.

For example, the above length information may be carried in resource reservation signaling. SCI 1 is used as the resource reservation signaling to indicate that a time-frequency resource will be reserved for transmission of PSCCH 2 and/or PSSCH 2. In addition, SCI 1 may also indicate the PSFCH length information in any of the above forms, and the CRC of SCI 1 is scrambled with the common identifier, hence, SCI 1 may be received by multiple UEs, so that these UEs may be avoided to transmit on the resources reserved by SCI 1, and more accurate AGC estimation may also be performed based on the PSFCH length indicated by SCI 1. Alternatively, PSCCH 2 may further carry SCI 2 used to schedule PSSCH 2. SCI 2 may use a format identical to that of conventional SCI, indicating such information as the time-frequency resource where PSSCH 2 is located and the MCS, and the CRC of SCI 2 may be scrambled with the UE-specific identifier, so that the receiving UE of PSCCH2 and PSSCH 2 may achieve correct reception of control and data information.

In an embodiment, the length information is configured or preconfigured or predefined to be related to one time-frequency resource or a group of time-frequency resources, the time-frequency resource(s) containing one or more slots in the time domain, and containing one or more resource blocks in the frequency domain.

In an embodiment, the time-frequency resource(s) may be configured by at least one of the following: radio resource control (RRC) signaling, system information, sidelink control information, or downlink control information. And the time-frequency resource(s) may include at least one of the following: a reception resource pool, a transmission resource pool, a bandwidth part, a carrier, or a component carrier.

For example, a PSFCH length may be configured or preconfigured for each resource pool. Resource pools are configured on a device-by-device basis, and a device may be configured with multiple resource pools. Hence, "configure or preconfigure for each resource pool" in this disclosure is simplified for "configure or preconfigure for each resource pool of each device". A resource pool is composed of a number of slots in the time domain and a number of RBs in the frequency domain. Resource pools may be transmission resource pools, or may reception resource pools, which are hereinafter referred to as resource pools, for the sake of simplicity. NR V2X will configure one or more resource pools for data transmission and reception for a device, hence, the PSFCH length may be configured in unit of the above resource pool. Or, when a PSFCH length is configured, it indicates which existing resource pool the PSFCH length is associated with.

Configuring or preconfiguring a PSFCH length for a resource pool may have two meanings:

supposing that a device does not need to perform PSFCH transmission and reception in a first resource pool (for example, the first resource pool is only used for broadcast services, the broadcast services needing no PSFCH), hence, a PSFCH length of the first resource pool refers to a PSFCH length from another resource pool possibly having effect on AGC of the first resource pool, and when the device performs reception in the first resource pool, it may perform additional AGC estimation according to the PSFCH length of the first resource pool;

supposing that a device needs to perform PSFCH transmission and reception in a first resource pool (for example, the first resource pool is used for unicast services, in some slots where PSFCHs exist, PSSCHs may be multiplexed with the PSFCHs in any of the above modes, and in some slots where no PSFCH exists, the entire slots may be used for PSFCH transmission and reception), at this moment of time, the PSFCH length of the first resource pool refers to not only a PSFCH length needed by the device in performing PSFCH transmission and reception in the first resource pool, but also a PSFCH length from another resource pool possibly having effect on AGC of the first resource pool, and when the device performs reception in the first resource pool, the PSFCH does not need to be received in each slot; the device performs reception of the PSFCH according to the PSFCH length of the first resource pool in a slot needing to receive a PSFCH, and the device may perform additional AGC estimation according to the PSFCH length of the first resource pool in a slot needing not to receive a PSFCH but needing to receive a PSSCH.

Configuring the PSFCH length for the resource pool also includes reconfiguring the PSFCH length as demanded. For example, when a longer PSFCH length is needed by a resource pool, a new PSFCH length may be reconfigured for the resource pool via RRC signaling.

A definition and configuration method for a resource pool in LTE V2X may be followed for a definition and configuration method of the resource pool. For details, reference may be made to subsection 14.1.5 of TS 36.213, and "subframe" therein is replace with "slot". Here, "configuration" may be applicable to a case where the device is in coverage of the network, and the device may receive network configuration information via, for example, at least one piece of system information (MIB/SIB), RRC signaling, DCI signaling, or SCI signaling; "preconfiguration" may be applicable to a case where the device is out of coverage of the network, and the device may perform V2X communication according to preconfiguration (i.e. default configuration or ex-works configuration or configuration specified in a standard). For the sake of simplicity, the term "configuration" is used in the following description, including the above two implementations, "configuration" and "preconfiguration".

A resource pool may not be configured with the PSFCH length or the PSFCH length may be configured to be zero, which means that AGC estimation in the resource pool needs to consider influence of the PSFCH. As a device may be configured with multiple resource pools, time-frequency resources of some resource pools may be used for being multiplexed with other devices. For example, the above devices are multiplexed in a group of overlapped time-frequency resources, or frequency division multiplexing is performed between the devices, which are collectively referred to as "multiplexing" in the following description, for the sake of simplicity.

For example, when a resource pool of UE 1 does not reuse other devices needing to use PSFCHs, the AGC estimation of UE 1 does not need to consider influence of the PSFCHs, that is, the principle in LTE V2X may be followed, and the AGC estimation is performed based on the first symbol in the slot; or, even if a resource pool of UE 1 reuses other devices needing to use PSFCHs, the base station or the other devices may judge that the resource pool is affected by the PSFCHs and may be ignored; for example, power of the PSFCHs is much smaller than useful signal power of UE 1, and at this moment of time, the PSFCH length may not be configured or the PSFCH length may be configured to be zero. Otherwise, when a resource pool of UE 1 reuses other devices needing to use PSFCHs, the UE 1 needs to consider influence of the PSFCHs on the AGC; for example, the AGC estimation may be performed according to the PSFCH length configured for the resource pool.

The configuration of the PSFCH length according to the resource pool provides flexibility of configuration. For example, the resource pools of all other devices that are multiplexed with UE 1 may be configured to have identical PSFCH lengths, so that UE 1 may only perform at most two times of AGC estimation in a slot; for example, different resource pools may have different PSFCH lengths, which may support and accommodate different feedback overhead; for another example, multiple resource pools belonging to the same device may also be configured to have identical PSFCH lengths, hence, the device may receive information from multiple resource pools, and may also perform at most two times of AGC estimation only in a slot.

Figure 16:
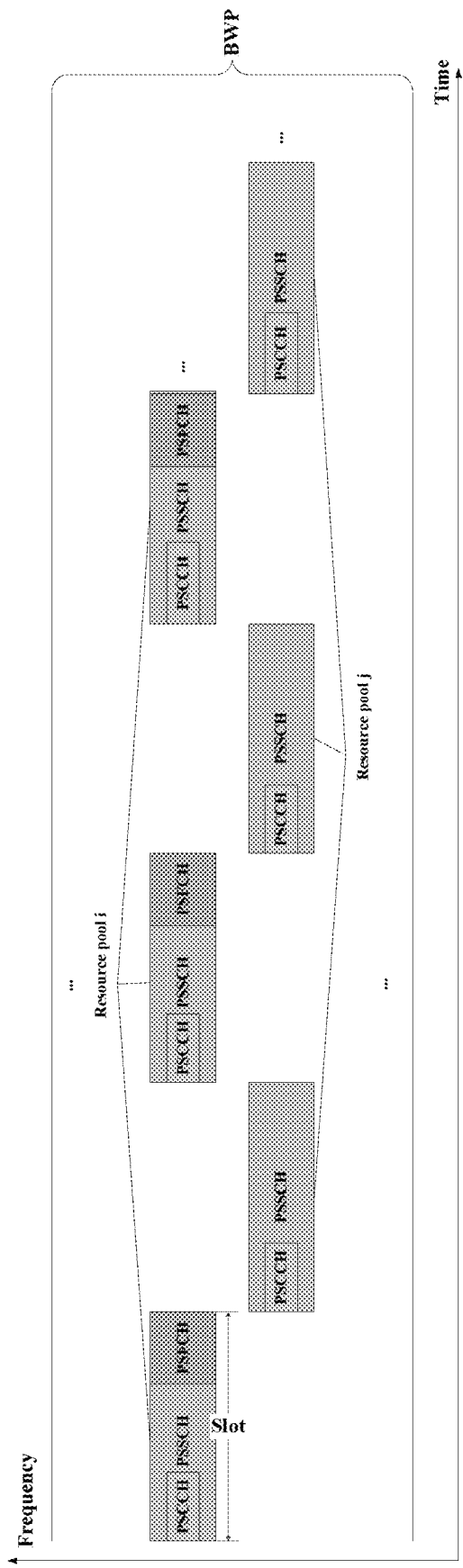
FIG. 16 is a schematic diagram of resource pool configuration of the embodiment of this disclosure.

FIG. 16 is a schematic diagram of resource pool configuration of the embodiment of this disclosure. For example, as shown in FIG. 16, resource pool i and resource pool j belong to UE 1, and coexist in a BWP of UE 1 in a time division multiplexing manner. In this BWP, if resource pool j is not multiplexed with the PSFCH, or interference or a signal change caused by the PSFCH is negligible, the PSFCH length of resource pool j may be configured to be zero, or a PSFCH length is not configured for resource pool j, that is, resource pool j may not need to consider influence of the PSFCH on AGC. In this BWP, resource pool i is multiplexed with the PSFCH, or the first device needs to receive or transmit feedback information via the PSFCH in resource pool i, hence, an appropriate PSFCH length may be configured for resource pool i, that is, resource pool i needs to consider the influence of the PSFCH on AGC.

Figure 17:
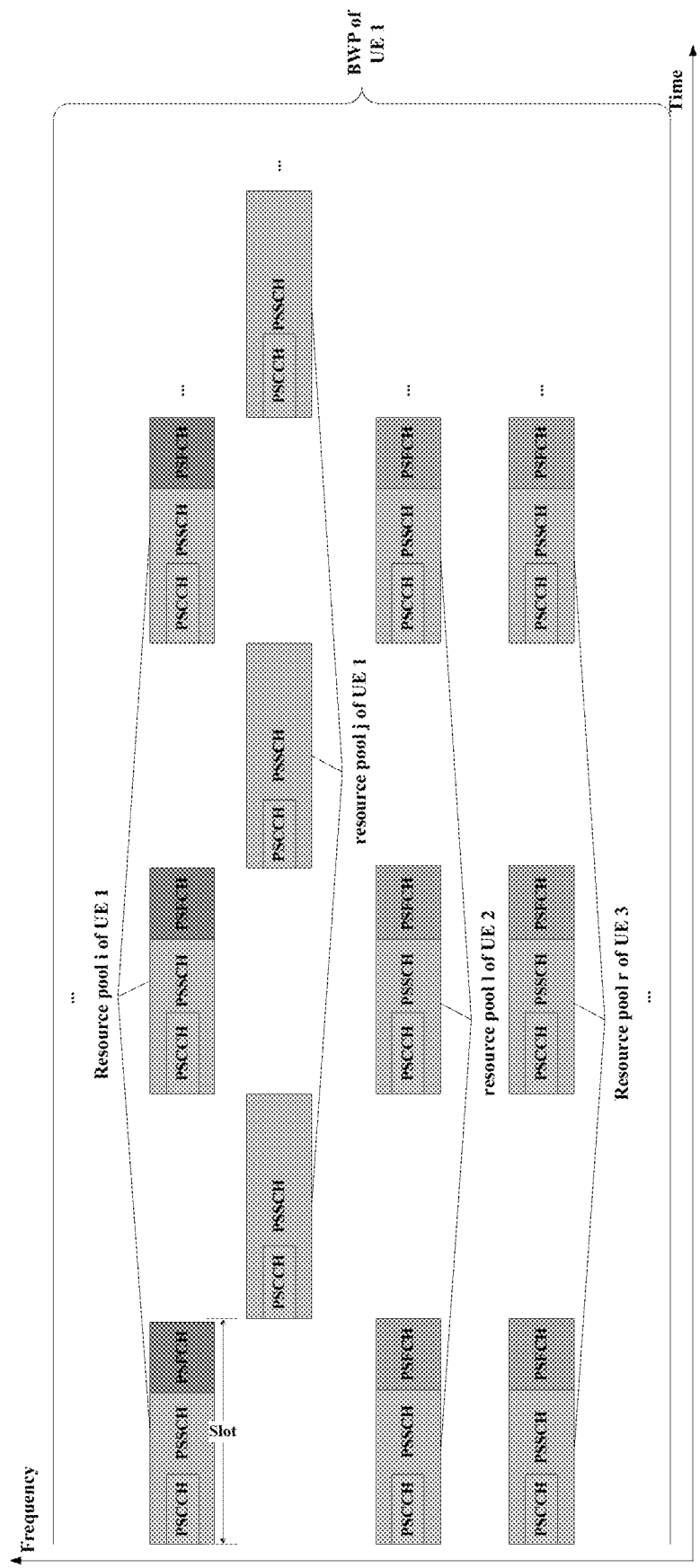
FIG. 17 is another schematic diagram of the resource pool configuration of the embodiment of this disclosure.

FIG. 17 is another schematic diagram of the resource pool configuration of the embodiment of this disclosure, giving an example of multiplexing resource pools of different devices in a BWP. For resource pool l belonging to UE 2, if the resource pool forms frequency division multiplexing with resource pool i of UE 1 (or overlaps with resource pool i in time-frequency resources), the PSFCH length of resource pool l may be configured to be identical to the PSFCH length of the resource pool I, and by aligning the PSFCH lengths, the number of times of AGC estimation of UE 1 in a slot of resource pool i may be reduced to two times at most. Likewise, resource pool r of UE 3, resource pool i and resource pool l form frequency division multiplexing, hence, the PSFCH lengths of resource pools r, i and l are configured to be identical.

The resource pool configurations of different devices shown in FIG. 17 may include at least the following cases.

For example, one case may be that resource pools i, j, r and l are all resource pools configured for UE 1, UE 2 and UE 3, that is, the three UEs share the four resource pools. At a slot, supposing that only resource pool i has information to be transmitted to UE 1, and only resource pool l contains PSFCH transmitted by UE 2, as both of them are located in the BWP of UE 1, AGC estimation of UE 1 will be affected by the PSFCH of UE 2.

For example, one case may be that only resource pools i and j are resource pools configured for UE 1, while resource pools l and r are resource pools respectively configured for UE 2 and UE 3. This is because that the number of resource pools for a UE is configurable. For example, up to four resource pools i, j, r and l may be configured in the BWP of UE 1, but UE 1 is currently configured with only two resource pools, i.e. resource pools i and j, and resource pools l and r not used by UE 1 are configured for use by other devices, such as UE 2, and UE 3, etc. Although resource pools l and r are not configured for UE 1, as resource pools l and r are still located in the BWP of UE 1, the AGC estimation of UE 1 in reception is still affected by the PSFCHs from resource pools l and r.

Figure 18:
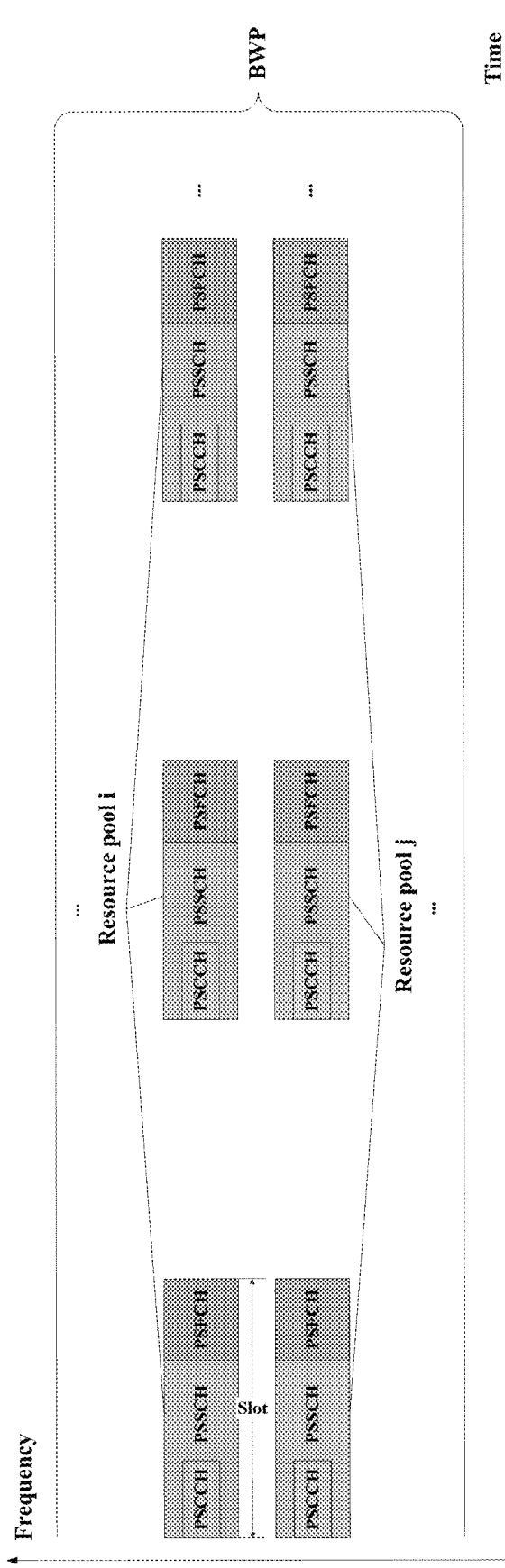
FIG. 18 is a further schematic diagram of the resource pool configuration of the embodiment of this disclosure.

FIG. 18 is a further schematic diagram of the resource pool configuration of the embodiment of this disclosure. For example, as shown in FIG. 18, resource pool i and resource pool j belonging to UE 1 coexist in the BWP of UE 1 in a frequency division multiplexing manner. Assuming that both resource pools i and j require configuration of PSFCH lengths, by configuring identical PSFCH lengths for resource pool i and resource pool j, the number of times of AGC estimation by UE 1 in a slot of resource pool i may be reduced to at most two times. For a resource pool l, if the resource pool l and resource pools i and j form frequency division multiplexing, or the resource pool l overlaps with resource pools i and j in time-frequency resources, the PSFCH length of resource pool l may be configured to be identical to those of resource pools i and j.

For the above configuration of PSFCH length, the PSFCH length may be taken as one of the parameters of the resource pools. For example, time domain and frequency domain positions of the resource pools may be configured in configuring the resource pools; the PSFCH length may also be configured independent of the resource pools, and by indicating on which resource pool the PSFCH length acts, association and a correspondence between the PSFCH length and the resource pools are established. For the above configuration, an adopted particular implementation may include at least one piece of system information (MIB/SIB), RRC signaling, DCI signaling, SCI signaling, or preconfiguration. Each resource pool may be independently configured or associated with a PSFCH length, and each resource pool may have a PSFCH length.

Figure 19:
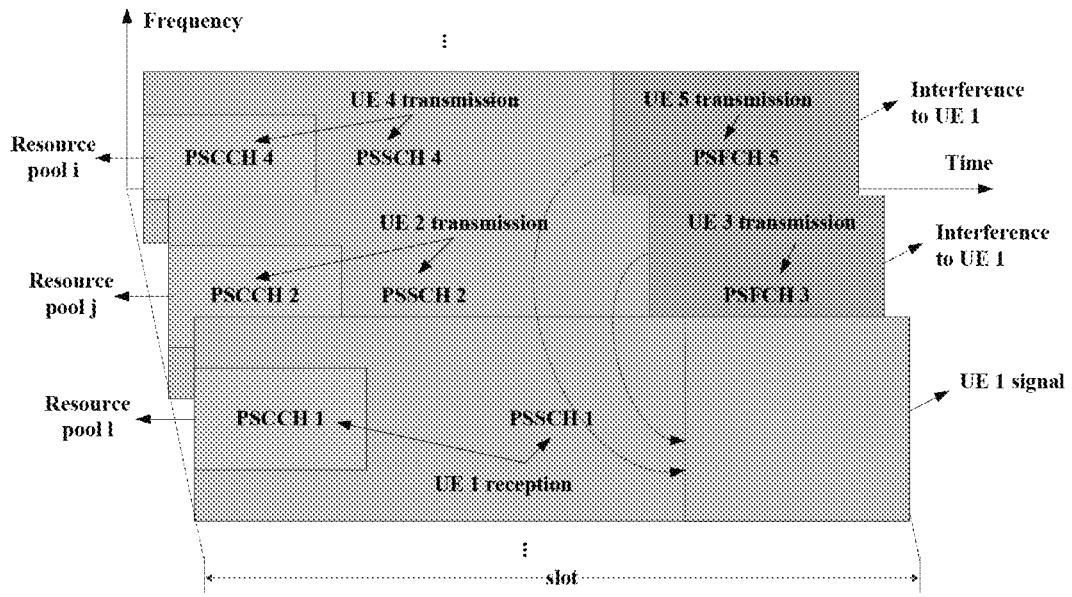
FIG. 19 is a yet further schematic diagram of performing sidelink resource multiplexing by multiple devices of the embodiment of this disclosure.
Figure 20:
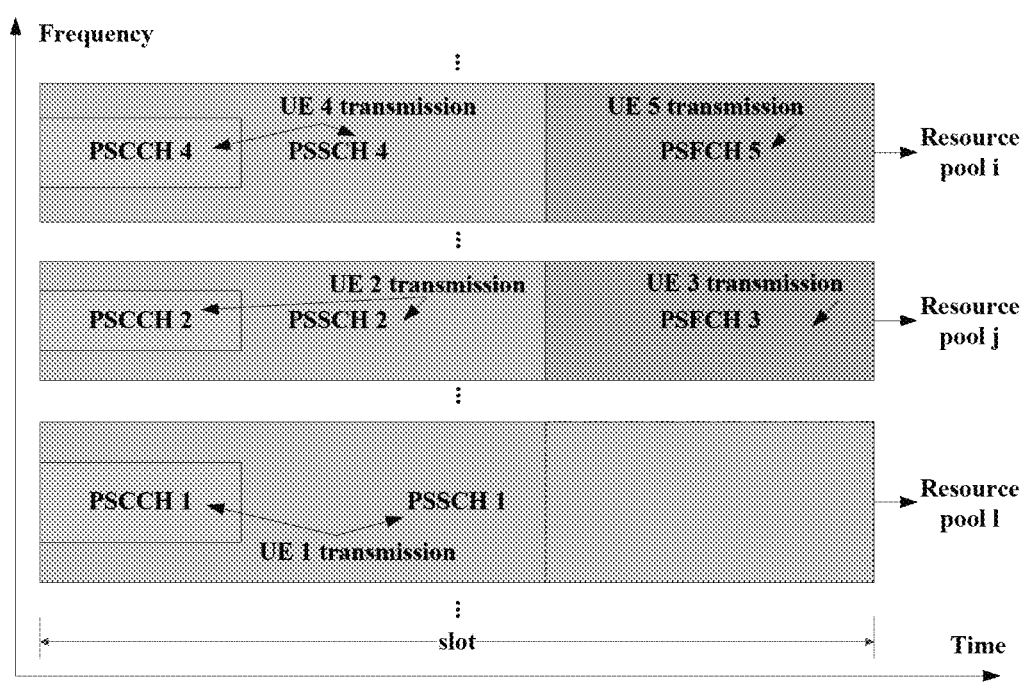
FIG. 20 is a yet further still schematic diagram of performing sidelink resource multiplexing by multiple devices of the embodiment of this disclosure.

FIG. 19 is a yet further schematic diagram of performing sidelink resource multiplexing by multiple devices of the embodiment of this disclosure. Compared with FIG. 13, PSFCH lengths of different resource pools of different devices with overlapped time-frequency resources are all identical. FIG. 20 is a yet further still schematic diagram of performing sidelink resource multiplexing by multiple devices of the embodiment of this disclosure. Compared with FIG. 15, PSFCH lengths of different resource pools of different frequency division multiplexed devices are all identical.

For example, either RRC signaling and/or system information may be used to semi-statically configure the PSFCH length for each resource pool, or SCI signaling and/or DCI signaling may be used to dynamically configure the PSFCH length, wherein the dynamically configured PSFCH length may override the semi-statically configured PSFCH length, that is, if the two are inconsistent, the dynamically configured PSFCH length shall prevail.

For example, a first PSFCH length is configured for a resource pool via the RRC signaling, but the SCI signaling indicates that a slot has a second PSFCH length, at this case, the PSFCH length in the slot is the second PSFCH length, that is, the SCI indication prevails. The semi-static configuration makes it easier to achieve alignment of lengths of multiple PSFCHs in the slot, the dynamic configuration may adjust lengths of the PSFCHs more flexibly and accurately according to demands for load or coverage, and a combination of the two may support PSFCH multiplexing more efficiently.

For another example, a PSFCH length may be configured or preconfigured for a group of time-frequency resources. A difference from the above configuration of the PSFCHs in units of resource pools is that a group of time-frequency resources here are configured independent of existing transmission/reception resource pools. For a particular configuration method of a group of time-frequency resources, a configuration method identical to that of the resource pools may be used according to, for example, the method described in subsection 14.1.5 of TS 36.213, and "subframe" therein is replace with "slot". A range of the PSFCH lengths is a group of time-frequency resources associated therewith. As a group of time-frequency resources are configured independent of the resource pools, this group of time-frequency resources may be different from or identical to the existing resource pools.

For a further example, each BWP may be configured or preconfigured with a PSFCH length, and each BWP has a PSFCH length. For still another example, each carrier or component carrier may be configured or preconfigured with a PSFCH length, and each carrier has a PSFCH length.

For yet another example, the length information is predefined. For example, the PSFCH lengths are specified in standards, and a PSFCH has a fixed length.

For the above PSFCH length configuration with a BWP or carrier as a granularity, it may be easily extended from the PSFCH length configuration of the resource pools. For example, the PSFCH length of the BWP or carrier may not be configured or may be configured to be zero, and the PSFCH length may be configured as one of parameters of the BWP or the carrier, or may be configured independently, etc., which shall not be enumerated herein one by one.

The above illustrates the necessity of indicating the PSFCH lengths from a perspective of the influence of the PSFCHs on AGC. In fact, the indicated length information is not limited to the PSFCH lengths, and may also be extended to other scenarios.

Figure 21:
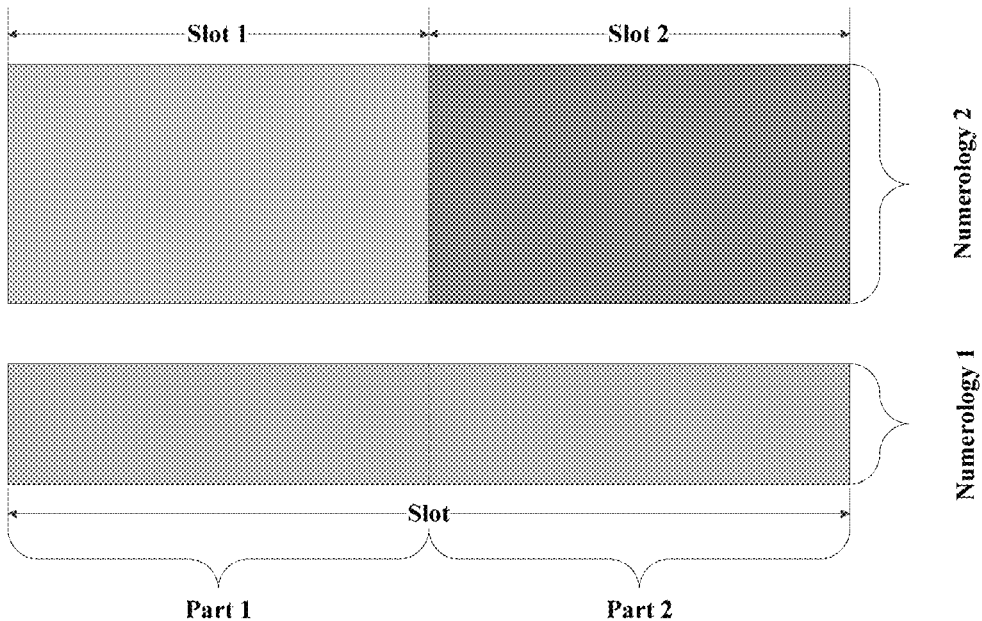
FIG. 21 is still another schematic diagram of the sidelink resources of the embodiment of this disclosure.

FIG. 21 is still another schematic diagram of the sidelink resources of the embodiment of this disclosure. For example, as shown in FIG. 21, frequency division multiplexing exists UE 1 using numerology 1 and UE 2 using numerology 2, or UE 1 is subject to interference from UE 2. As different numerologies have different subcarrier spacings, lengths of slots are different. As two slots (slot 1 and slot 2) of UE 2 may not have information to be transmitted at the same time, or there exist different devices to transmit respectively in slot 1 and slot 2, received power of UE 1 in a slot may change, hence, multiple times of AGC estimations are needed. For FIG. 21, the length of the slot of numerology 2 may be notified to UE 1 as length information, so that UE 1 is enabled to perform AGC estimation more accurately.

Figure 22:
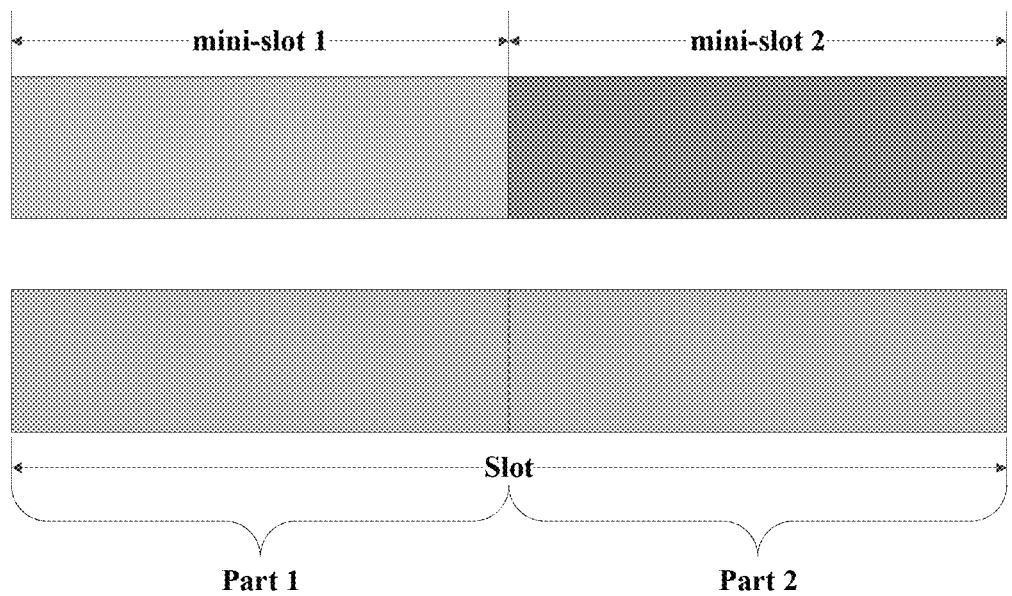
FIG. 22 is still another schematic diagram of the sidelink resources of the embodiment of this disclosure.

FIG. 22 is still another schematic diagram of the sidelink resources of the embodiment of this disclosure. For example, as shown in FIG. 22, although UE 1 and UE 2 use identical numerologies, UE 2 uses mini-slots (or called small slots, or non-slots)) for transmission, as granularities of information transmission in the time domain are different, a result similar to that in FIG. 21 may also be resulted in. For FIG. 22, the length of the mini-slot may be notified to UE 1 as length information, so that UE 1 is enabled to perform AGC estimation more accurately.

FIGS. 21 and 22 are only illustrated schematically as examples. There may exist other multiple relationships between lengths of slots of different numerologies, and there may exist other multiple relationships between lengths of slots and mini-slots, which shall not be enumerated herein one by one. In addition, it may be extended to a combination of FIG. 21 and FIG. 22. For example, UE 2 may use a numerology different from that of UE 1, and use mini-slots at the same time. Any of the above methods for configuring the lengths of the PSFCHs may be used for the configuration of the length information, which shall not described herein any further.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the second device receives the length information indicating the length of the first part in the slot transmitted by the terminal equipment or network device, and performs sidelink communication with the first device according to the length information. Hence, the second device is able to process the first part according to the length information, thereby improving performance of sidelink transmission (such as increasing accuracy of AGC estimation).

Embodiment 2

The embodiments of this disclosure provide a sidelink resource multiplexing method. The embodiments may be implemented separately, or may be implemented in combination with Embodiment 1, with contents identical to those in Embodiment 1 being not going to be described herein any further.

In the embodiment of this disclosure, the second device performs transmission and/or reception of sidelink information with the first device in a slot; wherein the slot includes at least a first part and a second part, the first part in the slot being configured with a first demodulation reference signal, and the second part in the slot being configured with a second demodulation reference signal.

Figure 23:
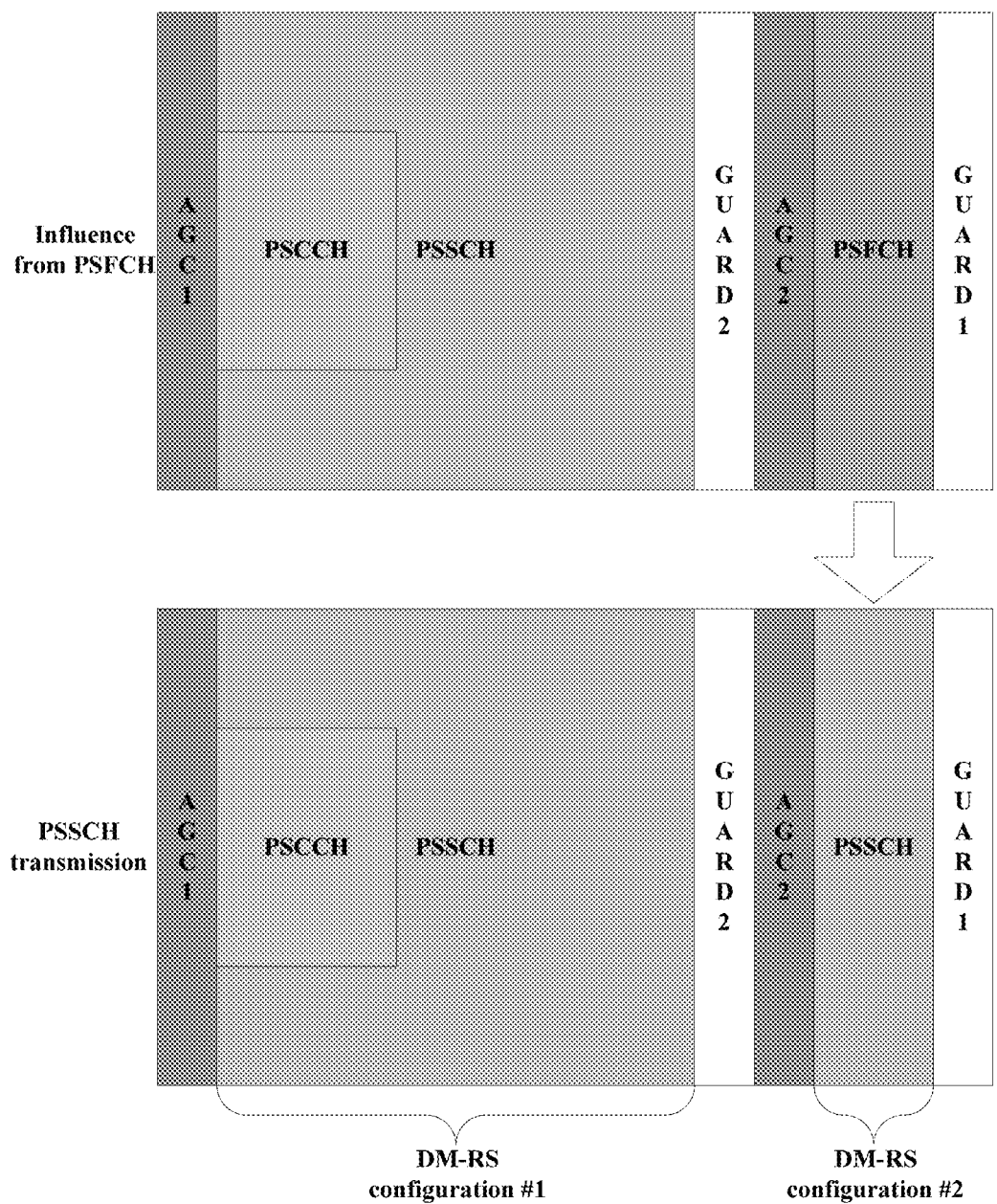
FIG. 23 is still another schematic diagram of the sidelink resources of the embodiment of this disclosure.
Figure 24:
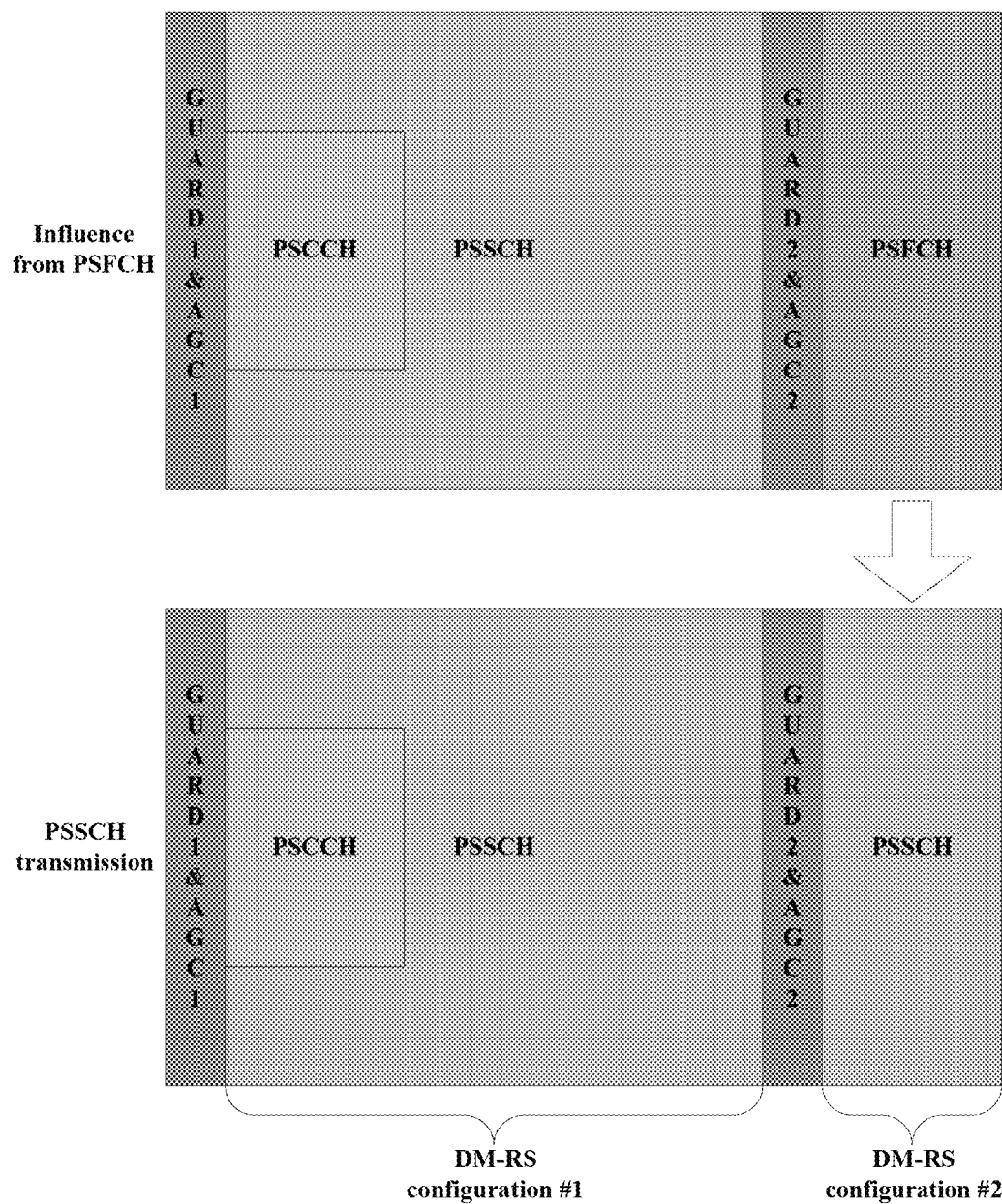
FIG. 24 is still another schematic diagram of the sidelink resources of the embodiment of this disclosure.

The influence of the PSFCH on the PSSCH multiplexed with it can be seen from Embodiment 1. FIG. 23 is still another schematic diagram of the sidelink resources of the embodiment of this disclosure, and FIG. 24 is still another schematic diagram of the sidelink resources of the embodiment of this disclosure, which show influence of two PSFCH slot structures on a PSSCH. As shown in FIGS. 23 and 24, the PSSCH at a rear part of the slot is multiplexed with the PSFCH. As mentioned above, the multiplexing here may be frequency division multiplexing, or multiplexing in a group of overlapped time-frequency resources, hence, the PSSCH is subject to the interference of the PSFCH.

As being subject to the influence of multiplexing the PSFCH, the AGC estimation needs to be performed separately on the PSSCH at the rear part of the slot and a PSSCH at a front part of the slot. Therefore, even if the PSSCHs are transmitted in one slot, the front PSSCH and the rear PSSCH in the slot need independent AGC estimation symbols. For example, an AGC 2 symbol before the rear PSSCH of the slot in FIG. 23 and GUARD 2 & AGC 2 symbols before the rear PSSCH of the slot in FIG. 24 may be used as the AGC estimation symbols for the PSSCHs.

If the DM-RS position configuration method in NR Rel-15 is followed, as the PSSCHs are transmitted by using the entire slot, the position of the DM-RS used for demodulation of the PSSCHs will be dependent on the length of the entire slot, and reference may be made to subsection 6.4.1.1 of TS 38.211 f30 for a particular DM-RS position. However, the DM-RS configuration that reuses NR may cause collisions between DM-RS symbols and AGC symbols, that is, a DM-RS symbol is located at a position of the AGC symbol of the rear PSSCH, for example, the DM-RS is located in AGC 2 symbol in FIG. 23 or GUARD 2 & AGC 2 symbols in FIG. 24. Considering that the length of the PSFCH may also be configurable or variable, the collision between the DM-RS symbol and the AGC symbol described above is likely to occur. As the AGC symbol cannot be used for demodulation, the DM-RS located at the position of the AGC symbol cannot be used, thereby resulting in loss of performance of channel estimation.

To solve this problem, when the PSSCHs are transmitted in the entire slot, the position of the DM-RS is not determined according to the length of the entire slot, but positions of a front part and a rear part of the DM-RS are independently determined according to symbol lengths occupied by the front PSSCH and the rear PSSCH in the slot (excluding the guard intervals and AGC symbols), that is, DM-RSs are independently configured for the front PSSCH and the rear PSSCH.

As shown in FIGS. 23 and 24, for example, two independent DM-RS configurations are used in one slot, i.e. DM-RS configuration #1 and DM-RS configuration #2. DM-RS configuration #1 is used to determine a DM-RS symbol position of the front PSSCH, which is dependent on the number of symbols occupied by the front PSSCH (excluding the guard intervals and AGC symbols), and DM-RS configuration #2 is used to determine a DM-RS symbol position of the rear PSSCH, which is dependent on the number of symbols occupied by the rear PSSCH (excluding the guard intervals and AGC symbols). Regardless of whether one DM-RS configuration is used or two DM-RS configurations are used, a particular method for configuring DM-RS positions is not limited. For example, the method in subsection 6.4.1.1 of TS 38.211 f30 may be used. In general, the DM-RS symbols are not located at positions of the guard intervals and AGC symbols in the slot.

In an embodiment, the first demodulation reference signal and/or the second demodulation reference signal are configured or preconfigured or predefined as being related to a time-frequency resource or a group of time-frequency resources, the time-frequency resource(s) containing one or more slots in the time domain, and containing one or more resource blocks in the frequency domain.

In an embodiment, the time-frequency resource(s) is/are configured by at least one of the following: radio resource control (RRC) signaling, system information (SI), sidelink control information (SCI), or downlink control information (DCI). The time-frequency resource(s) include(s) at least one of the following: a reception resource pool, a transmission resource pool, a bandwidth part, a carrier, or a component carrier.

For DM-RS positions, using one DM-RS configuration in one slot and using multiple DM-RS configurations in one slot may coexist. For example, for a resource pool configured with a PSFCH length and the PSFCH length is not zero, the resource pool may use multiple independent DM-RS configurations in a slot, as shown in FIG. 23 or FIG. 24; for a resource pool not configured with a PSFCH length or configured with a PSFCH length of zero, the resource pool may use one DM-RS configuration in one slot, such as following the DM-RS configuration method in NR Rel-15.

Figure 25:
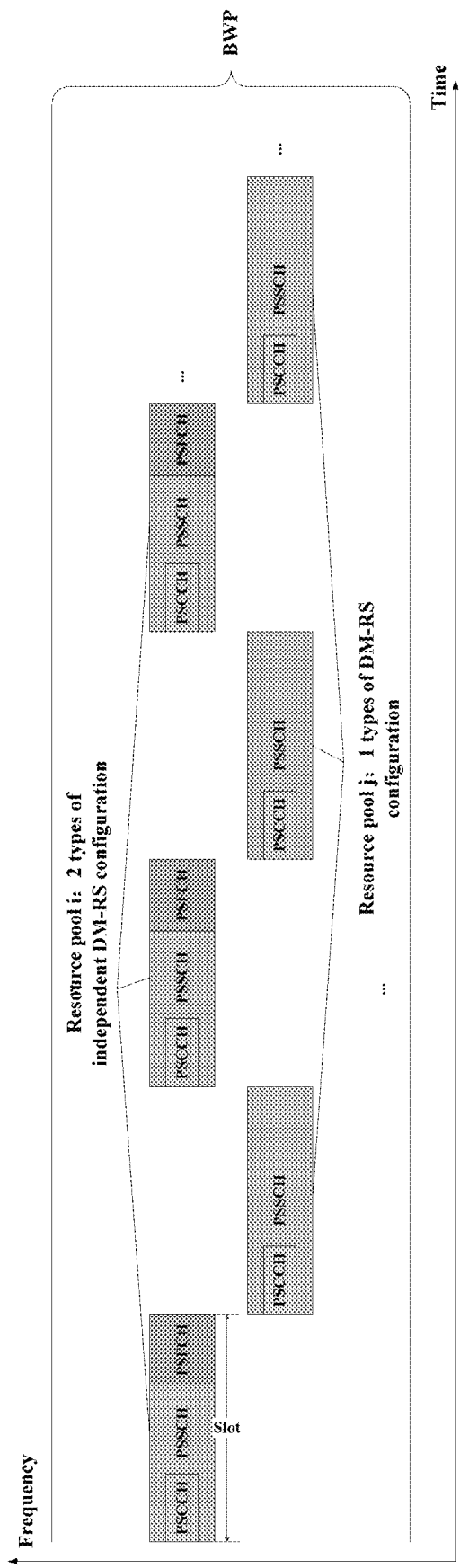
FIG. 25 is still another schematic diagram of the resource pool configuration of the embodiment of this disclosure.

FIG. 25 is still another schematic diagram of the resource pool configuration of the embodiment of this disclosure. As shown in FIG. 25, for resource pool i, two independent DM-RS configurations may be configured, and for resource pool j, one DM-RS configuration may be configured. By configuring two independent DM-RSs, accuracy of sidelink channel estimation may be improved.

Embodiment 3

The embodiments of this disclosure provide a sidelink resource multiplexing method. The embodiments may be implemented separately, or may be implemented in combination with Embodiment 1, or may be implemented in combination with Embodiment 2, or may be implemented in combination with Embodiment 1 and Embodiment 2, with contents identical to those in embodiments 1 and 2 being not going to be described herein any further.

In the embodiment of this disclosure, the second device performs transmission and/or reception of sidelink information with the first device in a slot; wherein in a case where at least two types of transmit power are needed in the slot, the maximum transmit power in the at least two types of transmit power is taken as transmit power of the slot.

Figure 26:
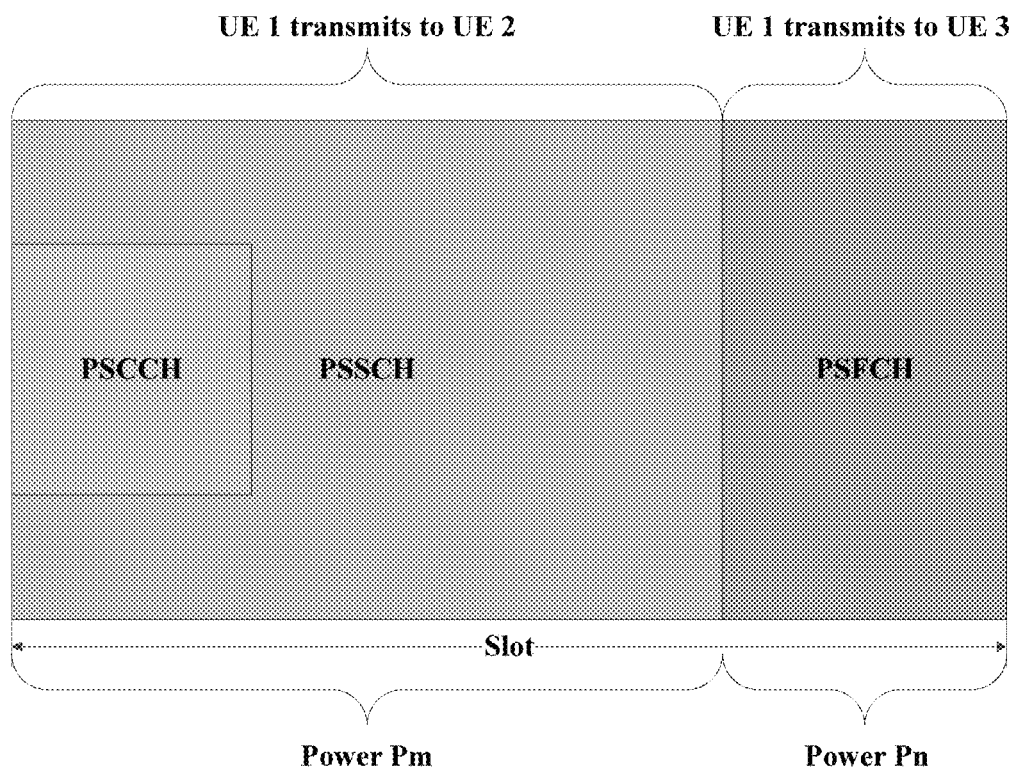
FIG. 26 is still another schematic diagram of the sidelink resources of the embodiment of this disclosure.

FIG. 26 is still another schematic diagram of the sidelink resources of the embodiment of this disclosure. As shown in FIG. 26, for example, for UE 1, it may need to transmit a PSCCH and a PSSCH to UE 2 in a slot, and transmit feedback information to UE 3 via PSFCH in this slot, that is, UE 1 supports two unicast sessions, i.e. a unicast session between UE 1 and UE 2, and a unicast session between UE 1 and UE 3.

Power control is of great significance to unicast, by power control, own demands for services may be satisfied, while interference to other devices may be avoided. However, as destination devices of a PSCCH/PSSCH and a PSFCH in the same slot are different, for example, a distance between UE 1 and UE 2 is much smaller than a distance between UE 1 and UE 3, transmit power determined by power control may possibly be different.

For example, as shown in FIG. 26, transmit power of the PSCCH/PSSCH is Pm, transmit power of the PSFCH is Pn, and reference may be made to section 7 of TS 38.213 for a particular process of determining final transmit power by power control, which shall not be described herein any further. Therefore, UE 1 needs to adjust power in a slot, i.e. symbol-level power adjustment, which is analogous to the slot-level (or subframe-level) power adjustment in NR Rel-15. Such dynamic power adjustment (symbol-level power adjustment) will increase complexity of hardware implementation of devices and have higher requirements on capabilities of the devices.

To solve this problem, let UE 1 select higher power of the PSCCH/PSSCH and the PSFCH as the final transmit power, that is, P=max{Pm, Pn}, and always use power P to transmit the PSCCH, PSSCH and PSFCH. For smaller transmit power Pmin=min{Pm, Pn} in Pm and Pn, the adjusted transmit power P is higher than original power value Pmin determined by power control, and a reception device of Pmin does not know that actual transmit power is adjusted.

In an embodiment, the at least two types of transmit power include first transmit power taken as the maximum transmit power and second transmit power smaller than the maximum transmit power.

In an embodiment, for the second transmit power, the information associated with the second transmit power is transmitted by using a phase modulation mode. For example, sidelink control information (SCI) may be used to indicate the phase modulation mode.

For example, in order not to affect normal reception of a device, UE 1 may transmit information to the device by using the phase modulation mode (such as QPSK and other modulation modes). Accordingly, a code rate also needs to be adjusted according to the phase modulation mode, and an actually used modulation and coding scheme in the SCI is notified to the reception device of Pmin. As a size of power has no effect on a demodulation performance of a phase modulation symbol, a device receiving the phase modulation symbol (corresponding to power Pmin) may still receive demodulation correctly, and the power adjustment is transparent to the device.

In an embodiment, at least one piece of the following signaling or information may be used to transmit the first transmit power to the reception device of the second transmit power: radio resource control (RRC) signaling, system information (SI), sidelink control information (SCI), or downlink control information (DCI).

In an embodiment, at least one piece of the following signaling or information may also be used to transmit a difference or ratio between the first transmit power and the second transmit power to the reception device of the second transmit power: radio resource control (RRC) signaling, system information (SI), sidelink control information (SCI), or downlink control information (DCI).

For example, UE 1 may be made to notify adjusted power P to the reception device of Pmin via signaling (such as SCI). Alternatively, UE 1 may be made to notify a variable ΔP=P−Pmin or ΔP=Pmin−P of the power to the reception device of Pmin via signaling (such as SCI), so that the reception device may recover actual transmit power P.

Therefore, when more than one type of power needs to be used for transmission in a slot, the maximum power therein is used for transmission, which may reduce complexity of power control and power adjustment.

Embodiment 4

The embodiments of this disclosure provide a sidelink resource indication method, in which indication is made to a second device by a terminal equipment or a network device. The terminal equipment may be a first device performing sidelink communication with the second device, or may be another terminal equipment, and this disclosure is not limited thereto.

In the embodiment of this disclosure, the terminal equipment or network device transmits length information indicating a length of a first part in a slot to the second device; wherein the length information is used by the second device in performing transmission and/or reception of sidelink information with the first device.

In an embodiment, the length information is used by the second device to perform AGC on the first part.

In an embodiment, the length information includes at least one of the following: a length of a physical sidelink feedback channel, a length of a slot to which a numerology corresponds, or a length of a mini-slot.

In an embodiment, the sidelink information includes information carried by at least one of the following channels: a physical sidelink control channel, a physical sidelink shared channel, or a physical sidelink feedback channel.

In an embodiment, when there exist at least two of the lengths of the first part within a time range overlapping with the slot in time, the at least two lengths of the first part are configured to be identical.

In an embodiment, the length information is configured by at least one piece of the following: radio resource control (RRC) signaling, system information (SI), sidelink control information (SCI), or downlink control information (DCI).

In an embodiment, a cyclic redundancy check (CRC) code of the sidelink control information is scrambled with a common identifier.

In an embodiment, the sidelink control information indicates at least one of the following: a length of a physical sidelink feedback channel, a slot where the physical sidelink feedback channel is located, a symbol where the physical sidelink feedback channel is located, a resource block where the physical sidelink feedback channel is located, a slot where the physical sidelink shared channel is located, a symbol where the physical sidelink shared channel is located, or a resource block where the physical sidelink shared channel is located.

In an embodiment, the length information is configured or preconfigured or predefined to be related to one or a group of time-frequency resources, the time-frequency resource(s) including one or more slots in the time domain, and including one or more resource blocks in the frequency domain.

In an embodiment, the time-frequency resource(s) is/are configured by at least one piece of the following: radio resource control (RRC) signaling, system information, sidelink control information, or downlink control information.

In an embodiment, the time-frequency resource(s) include(s) at least one of the following: a reception resource pool, a transmission resource pool, a bandwidth part, a carrier, or a component carrier.

In one embodiment, the length information is predefined.

In an embodiment, one or more symbols preceding the first part in the slot carry information used for the automatic gain control.

In an embodiment, the one or more symbols preceding the first part in the slot is/are used as a guard interval/guard intervals.

In an embodiment, the former one symbol of the first part in the slot carries information used for the automatic gain control and is used as a guard interval.

In an embodiment, the slot further includes at least one second part, one or more symbols preceding the second part in the slot carrying the information used for the automatic gain control and/or being used as a guard interval/guard intervals.

In an embodiment, the second part is a physical sidelink control channel and/or a physical sidelink shared channel.

In an embodiment, the first part in the slot is configured with a first demodulation reference signal, and another part in the slot is at least configured with a second demodulation reference signal.

In an embodiment, the first demodulation reference signal and/or the second demodulation reference signal are configured or preconfigured or predefined to be related to a time-frequency resource or a group of time-frequency resources, the time-frequency resource(s) including one or more slots in the time domain, and including one or more resource blocks in the frequency domain.

In an embodiment, the time-frequency resource(s) is/are configured by at least one piece of the following: radio resource control (RRC) signaling, system information (SI), sidelink control information (SCI), or downlink control information (DCI).

In an embodiment, the time-frequency resource(s) include(s) at least one of the following: a reception resource pool, a transmission resource pool, a bandwidth part (BWP), a carrier, or a component carrier.

In an embodiment, in a case where at least two types of transmit power are needed in the slot, the maximum transmit power in the at least two types of transmit power is taken as transmit power of the slot.

It can be seen from the above embodiment that the second device receives the length information indicating the length of the first part in the slot transmitted by the terminal equipment or network device, and performs sidelink communication with the first device according to the length information. Hence, the second device is able to process the first part according to the length information, thereby improving performance of sidelink transmission (such as increasing accuracy of AGC estimation).

Furthermore, the first part of the slot is configured with the first demodulation reference signal, and the second part of the slot is configured with the second demodulation reference signal. By independently configuring at least two types of DM-RSs, accuracy of sidelink channel estimation may be improved.

Moreover, in a case where more than one type of transmit power are needed in a slot, the maximum transmit power therein is used for transmission, which may reduce complexity of power control and power adjustment.

Embodiment 5

The embodiments of this disclosure provide a sidelink resource multiplexing apparatus. The apparatus may be a terminal equipment, or may be one or more components or assemblies configured in a terminal equipment; however, this disclosure is not limited thereto; for example, it may also be a roadside device or a network device, or may be one or more components or assemblies configured in a roadside device or a network device. Contents in the embodiments identical to those in embodiments 1-3 shall not be described herein any further.

Figure 27:
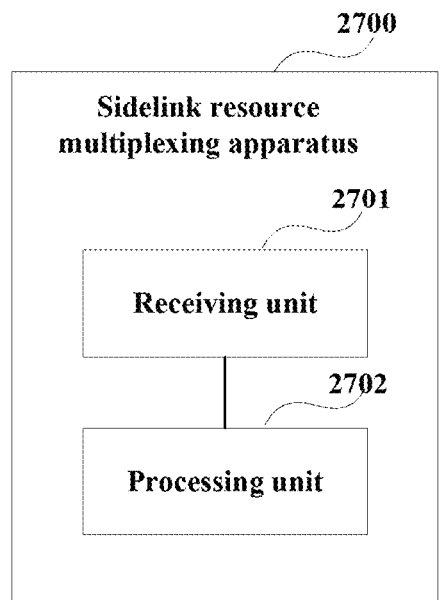
FIG. 27 is a schematic diagram of the sidelink resource multiplexing apparatus of an embodiment of this disclosure.

FIG. 27 is a schematic diagram of the sidelink resource multiplexing apparatus of an embodiment of this disclosure. As shown in FIG. 27, a sidelink resource multiplexing apparatus 2700 includes:

a receiving unit 2701 configured to receive length information indicating a length of a first part in a slot transmitted by a terminal equipment or a network device; and a processing unit 2702 configured to perform transmission and/or reception of sidelink information with a first device according to the length information.

In an embodiment, the processing unit is further configured to perform automatic gain control on the first part according to the length information.

In an embodiment, the length information includes at least one of the following: a length of a physical sidelink feedback channel, a slot length to which a numerology corresponds, or a length of a mini-slot.

In an embodiment, the sidelink information includes information carried by at least one of the following channels: a physical sidelink control channel, a physical sidelink shared channel, or a physical sidelink feedback channel.

In an embodiment, when there exist at least two lengths of the first parts in a time range overlapping in time with the slot, the at least two lengths of the first parts are configured as being identical.

In an embodiment, the length information is configured by at least one of the following: radio resource control signaling, system information, sidelink control information, or downlink control information.

In an embodiment, a cyclic redundancy check code of the sidelink control information is scrambled by using a common identifier; and the sidelink control information indicates at least one of the following: a length of a physical sidelink feedback channel, a slot at which a physical sidelink feedback channel is present, a symbol where a physical sidelink feedback channel is located, a resource block where a physical sidelink feedback channel is located, a slot at which a physical sidelink shared channel is present, a symbol where a physical sidelink shared channel is located, or a resource block where a physical sidelink shared channel is located.

In an embodiment, the length information is configured or preconfigured or predefined as being related to a time-frequency resource or a group of time-frequency resources, the time-frequency resource(s) containing one or more slots in the time domain, and containing one or more resource blocks in the frequency domain.

In an embodiment, the time-frequency resource(s) is/are configured by at least one piece of the following: radio resource control signaling, system information, sidelink control information, or downlink control information.

In an embodiment, the time-frequency resource(s) include(s) at least one of the following: a reception resource pool, a transmission resource pool, a bandwidth part, a carrier, or a component carrier.

In an embodiment, the length information is predefined.

In an embodiment, one or more symbols preceding the first part in the slot carry/carries information used for the automatic gain control, and one or more symbols preceding the first part in the slot is/are taken as a guard interval/guard intervals.

In an embodiment, the slot at least further includes a second part, and one or more symbols preceding the second part in the slot carry/carries information used for the automatic gain control and/or is/are taken as guard interval(s).

In an embodiment, the first part in the slot is configured with a first demodulation reference signal, and another part in the slot is at least configured with a second demodulation reference signal.

In an embodiment, the first demodulation reference signal and/or the second demodulation reference signal is/are configured or preconfigured or predefined as being related to a time-frequency resource or a group of time-frequency resources, the time-frequency resource(s) containing one or more slots in time domain, and containing one or more resource blocks in frequency domain.

In an embodiment, the time-frequency resource(s) is/are configured by at least one of the following: radio resource control signaling, system information, sidelink control information, or downlink control information.

In an embodiment, the time-frequency resource(s) include(s) at least one of the following: a reception resource pool, a transmission resource pool, a bandwidth part, a carrier, or a component carrier.

In an embodiment, in a case where at least two types of transmit power are needed in the slot, a maximum transmit power in the at least two types of transmit power is taken as the transmit power of the slot.

It should be noted that the components or modules related to this disclosure are only described above. However, this disclosure is not limited thereto, and the sidelink resource multiplexing apparatus 2700 may further include other components or modules, and reference may be made to related techniques for particulars of these components or modules.

Furthermore, for the sake of simplicity, connection relationships between the components or modules or signal profiles thereof are only illustrated in FIG. 27. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the second device receives the length information indicating the length of the first part in the slot transmitted by the terminal equipment or network device, and performs sidelink communication with the first device according to the length information. Hence, the second device is able to process the first part according to the length information, thereby improving performance of sidelink transmission (such as increasing accuracy of AGC estimation).

Furthermore, the first part of the slot is configured with the first demodulation reference signal, and the second part of the slot is configured with the second demodulation reference signal. By independently configuring at least two types of DM-RSs, accuracy of sidelink channel estimation may be improved.

Moreover, in a case where more than one type of transmit power are needed in a slot, the maximum transmit power therein is used for transmission, which may reduce complexity of power control and power adjustment.

Embodiment 6

The embodiments of this disclosure provide a sidelink resource indication apparatus. The apparatus may be a terminal equipment, or may be one or more components or assemblies configured in a terminal equipment; however, this disclosure is not limited thereto; for example, it may also be a roadside device or a network device, or may be one or more components or assemblies configured in a roadside device or a network device. Contents in the embodiments identical to those in Embodiment 4 shall not be described herein any further.

Figure 28:
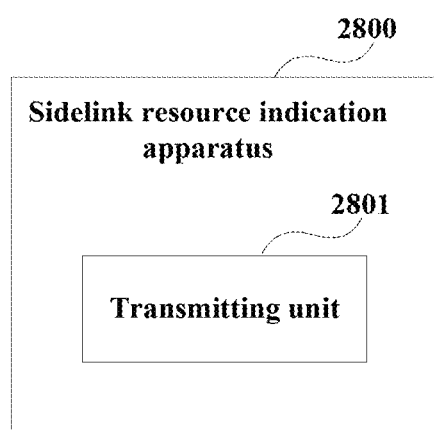
FIG. 28 is a schematic diagram of the sidelink resource indication apparatus of an embodiment of this disclosure.

FIG. 28 is a schematic diagram of the sidelink resource indication apparatus of an embodiment of this disclosure. As shown in FIG. 28, a sidelink resource indication apparatus 2800 includes:

a transmitting unit 2801 configured to transmit length information indicating a length of a first part in a slot to a second device; wherein the length information is used by the second device in performing transmission and/or reception of sidelink information with a first device.

It should be noted that the components or modules related to this disclosure are only described above. However, this disclosure is not limited thereto, and the sidelink resource indication apparatus 2800 may further include other components or modules, and reference may be made to related techniques for particulars of these components or modules.

Furthermore, for the sake of simplicity, connection relationships between the components or modules or signal profiles thereof are only illustrated in FIG. 28. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the second device receives the length information indicating the length of the first part in the slot transmitted by the terminal equipment or network device, and performs sidelink communication with the first device according to the length information. Hence, the second device is able to process the first part according to the length information, thereby improving performance of sidelink transmission (such as increasing accuracy of AGC estimation).

Furthermore, the first part of the slot is configured with the first demodulation reference signal, and the second part of the slot is configured with the second demodulation reference signal. By independently configuring at least two types of DM-RSs, accuracy of sidelink channel estimation may be improved.

Moreover, in a case where more than one type of transmit power are needed in a slot, the maximum transmit power therein is used for transmission, which may reduce complexity of power control and power adjustment.

Embodiment 7

The embodiments of this disclosure provide a communication system, and reference may be made to FIG. 1, with contents identical to those in embodiments 1-6 being not going to be described herein any further. In an embodiment, the communication system 100 may include:

a first device 102 configured to perform sidelink communication with a second device 103; and the second device 103 configured to receive length information indicating a length of a first part in a slot transmitted by a terminal equipment or a network device, and perform transmission and/or reception of sidelink information with the first device 102 according to the length information.

As shown in FIG. 1, the communication system 100 may further include:

a network device 101 configured to provide services for the first device 102 and/or the second device 103. For example, the network device 101 transmits length information indicating a length of a first part in a slot to the second device 103.

The embodiment of this disclosure further provides a network device, which may be, for example, a base station. However, this disclosure is not limited thereto, and it may also be another network device.

Figure 29:
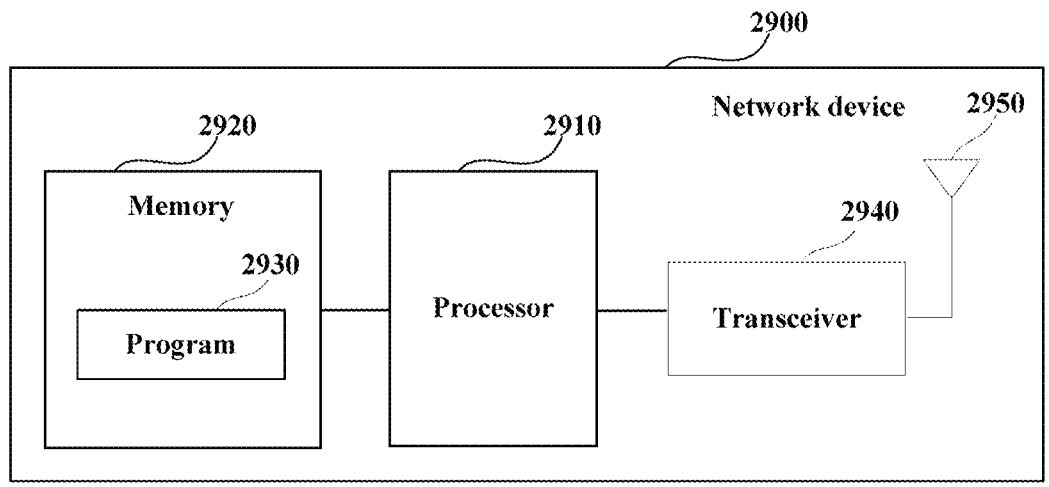
FIG. 29 is a schematic diagram of the network device of an embodiment of this disclosure.

FIG. 29 is a schematic diagram of a structure of the network device of the embodiment of this disclosure. As shown in FIG. 29, a network device 2900 may include a processor 2910 (such as a central processing unit (CPU)) and a memory 2920, the memory 2920 being coupled to the processor 2910. The memory 2920 may store various data, and furthermore, it may store a program 2930 for data processing, and execute the program 2930 under control of the processor 2910.

For example, the processor 2910 may be configured to execute the program to carry out the sidelink resource indication method as described in Embodiment 4. For example, the processor 2910 may be configured to perform the following control: transmitting length information indicating a length of a first part in a slot to a second device; wherein the length information is used by the second device in performing transmission and/or reception of sidelink information with a first device.

Furthermore, as shown in FIG. 29, the network device 2900 may include a transceiver 2940, and an antenna 2950, etc. Functions of the above components are similar to those in the relevant art, and shall not be described herein any further. It should be noted that the network device 2900 does not necessarily include all the parts shown in FIG. 29, and furthermore, the network device 2900 may include parts not shown in FIG. 29, and the relevant art may be referred to.

The embodiment of this disclosure further provides a terminal equipment, however, this disclosure is not limited thereto, and it may also be another equipment.

Figure 30:
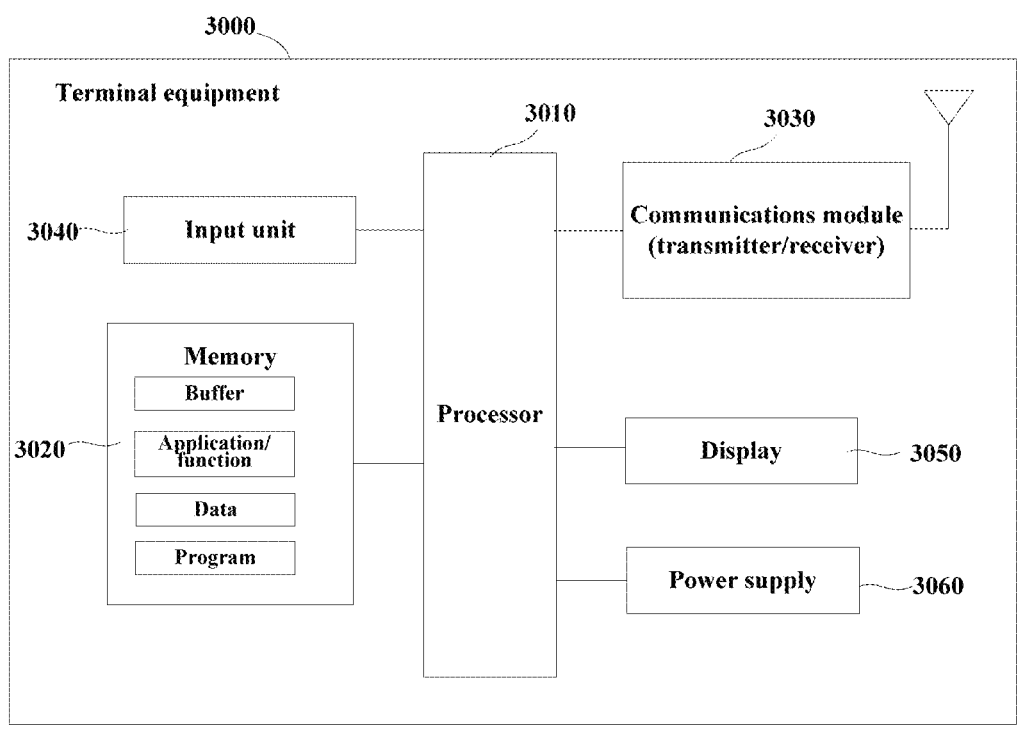
FIG. 30 is a schematic diagram of the terminal equipment of an embodiment of this disclosure.

FIG. 30 is a schematic diagram of the terminal equipment of the embodiment of this disclosure. As shown in FIG. 30, a terminal equipment 3000 may include a processor 3010 and a memory 3020, the memory 3020 storing data and a program and being coupled to the processor 3010. It should be noted that this figure is illustrative only, and other types of structures may also be used, so as to supplement or replace this structure and achieve a telecommunications function or other functions.

For example, the processor 3010 may be configured to execute a program to carry out the sidelink resource multiplexing method as described in Embodiment 1. For example, the processor 3010 may be configured to perform the following control: receiving length information indicating a length of a first part in a slot transmitted by a terminal equipment or a network device; and performing transmission and/or reception of sidelink information with a first device according to the length information.

For another example, the processor 3010 may be configured to execute a program to carry out the sidelink resource multiplexing method as described in Embodiment 2. For example, the processor 3010 may be configured to perform the following control: performing transmission and/or reception of sidelink information with a first device in a slot; wherein the slot includes at least a first part and a second part, the first part in the slot being configured with a first demodulation reference signal, and the second part in the slot being configured with a second demodulation reference signal.

For a further example, the processor 3010 may be configured to execute a program to carry out the sidelink resource multiplexing method as described in Embodiment 3. For example, the processor 3010 may be configured to perform the following control: performing transmission and/or reception of sidelink information with a first device in a slot; wherein in a case where at least two types of transmit power are needed in the slot, the maximum transmit power in the at least two types of transmit power is taken as transmit power of the slot.

As shown in FIG. 30, the terminal equipment 3000 may further include a communication module 3030, an input unit 3040, a display 3050, and a power supply 3060; functions of the above components are similar to those in the relevant art, which shall not be described herein any further. It should be noted that the terminal equipment 3000 does not necessarily include all the parts shown in FIG. 30, and the above components are not necessary. Furthermore, the terminal equipment 3000 may include parts not shown in FIG. 30, and the relevant art may be referred to.

An embodiment of the present disclosure provides a computer program, which, when executed in a terminal equipment, will cause the terminal equipment to carry out the sidelink resource multiplexing method as described in Embodiments 1-3 or the sidelink resource multiplexing method as described in Embodiment 4.

An embodiment of this disclosure provides a storage medium, including a computer program, which will cause a terminal equipment to carry out the sidelink resource multiplexing method as described in Embodiments 1-3 or the sidelink resource multiplexing method as described in Embodiment 4.

An embodiment of the present disclosure provides a computer program, which, when executed in a network device, will cause the network device to carry out the sidelink resource multiplexing method as described in Embodiments 1-3 or the sidelink resource multiplexing method as described in Embodiment 4.

An embodiment of this disclosure provides a storage medium, including a computer program, which will cause a network device to carry out the sidelink resource multiplexing method as described in Embodiments 1-3 or the sidelink resource multiplexing method as described in Embodiment 4.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations containing the above embodiments, following supplements are further disclosed.

Supplement 1. A sidelink resource multiplexing method, including:
receiving, by a second device, length information indicating a length of a first part in a slot transmitted by a terminal equipment or a network device; and
performing transmission and/or reception of sidelink information by the second device with a first device according to the length information.

Supplement 2. The method according to supplement 1, wherein, the second device performs automatic gain control on the first part according to the length information.

Supplement 3. The method according to supplement 1 or 2, wherein the length information includes at least one of the following: a length of a physical sidelink feedback channel, a slot length to which a numerology corresponds, or a length of a mini-slot.

Supplement 4. The method according to any one of supplements 1-3, wherein the sidelink information includes information carried by at least one of the following channels: a physical sidelink control channel, a physical sidelink shared channel, or a physical sidelink feedback channel.

Supplement 5. The method according to any one of supplements 1-4, wherein when there exist at least two lengths of the first parts in a time range overlapping in time with the slot, the at least two lengths of the first parts are configured as being identical.

Supplement 6. The method according to any one of supplements 1-5, wherein the length information is configured by at least one of the following: radio resource control (RRC) signaling, system information (SI), sidelink control information (SCI), or downlink control information (DCI).

Supplement 7. The method according to supplement 6, wherein a cyclic redundancy check code of the sidelink control information is scrambled by using a common identifier.

Supplement 8. The method according to supplement 7, wherein the sidelink control information indicates at least one of the following: a length of a physical sidelink feedback channel, a slot at which a physical sidelink feedback channel is present, a symbol where a physical sidelink feedback channel is located, a resource block where a physical sidelink feedback channel is located, a slot at which a physical sidelink shared channel is present, a symbol where a physical sidelink shared channel is located, or a resource block where a physical sidelink shared channel is located.

Supplement 9. The method according to supplement 6, wherein in a slot, when first length information configured by the sidelink control information (SCI) and/or the downlink control information (DCI) is different from a second length information configured by the radio resource control (RRC) signaling and/or the system information (SI), length information of the slot is determined as the first length information.

Supplement 10. The method according to any one of supplements 1-9, wherein the length information is configured or preconfigured or predefined as being related to a time-frequency resource or a group of time-frequency resources, the time-frequency resource(s) containing one or more slots in the time domain, and containing one or more resource blocks in the frequency domain.

Supplement 11. The method according to supplement 10, wherein the time-frequency resource(s) is/are configured by at least one of the following: radio resource control (RRC) signaling, system information, sidelink control information, or downlink control information.

Supplement 12. The method according to supplement 10 or 11, wherein the time-frequency resource(s) include(s) at least one of the following: a reception resource pool, a transmission resource pool, a bandwidth part, a carrier, or a component carrier.

Supplement 13. The method according to any one of supplements 1-5, wherein the length information is predefined.

Supplement 14. The method according to any one of supplements 1-13, wherein one or more symbols preceding the first part in the slot carry/carries information used for the automatic gain control.

Supplement 15. The method according to supplement 14, wherein one or more symbols preceding the first part in the slot is/are taken as guard interval(s).

Supplement 16. The method according to any one of supplements 1-13, wherein a symbol preceding the first part in the slot carries information used for the automatic gain control and is taken as a guard interval.

Supplement 17. The method according to any one of supplements 1-16, wherein the slot at least further includes a second part, and one or more symbols preceding the second part in the slot carry/carries information used for the automatic gain control and/or is/are taken as guard interval(s).

Supplement 18. The method according to supplement 17, wherein the second part is a physical sidelink control channel and/or a physical sidelink shared channel.

Supplement 19. The method according to any one of supplements 1-18, wherein the first part in the slot is configured with a first demodulation reference signal, and another part in the slot is at least configured with a second demodulation reference signal.

Supplement 20. The method according to supplement 19, wherein the first demodulation reference signal and/or the second demodulation reference signal is/are configured or preconfigured or predefined as being related to a time-frequency resource or a group of time-frequency resources, the time-frequency resource(s) containing one or more slots in time domain, and containing one or more resource blocks in frequency domain.

Supplement 21. The method according to supplement 20, wherein the time-frequency resource(s) is/are configured by at least one of the following: radio resource control (RRC) signaling, system information (SI), sidelink control information (SCI), or downlink control information (DCI).

Supplement 22. The method according to supplement 20 or 21, wherein the time-frequency resource(s) include(s) at least one of the following: a reception resource pool, a transmission resource pool, a bandwidth part, a carrier, or a component carrier.

Supplement 23. The method according to any one of supplements 1-22, wherein, in a case where at least two types of transmit power are needed in the slot, a maximum transmit power in the at least two types of transmit power is taken as the transmit power of the slot.

Supplement 24. The method according to supplement 23, wherein the at least two types of transmit power include first transmit power taken as the maximum transmit power and second transmit power less than the maximum transmit power.

Supplement 25. The method according to supplement 24, wherein for the second transmit power, information associated with the second transmit power is transmitted by using a phase modulation mode.

Supplement 26. The method according to supplement 25, wherein the phase modulation mode is indicated by sidelink control information (SCI).

Supplement 27. The method according to supplement 24, wherein the first transmit power is transmitted to a reception device of the second transmit power by using at least one piece of the following signaling or information: radio resource control (RRC) signaling, system information (SI), sidelink control information (SCI), or downlink control information (DCI).

Supplement 28. The method according to supplement 24, wherein a difference between the first transmit power and the second transmit power or a ratio of the first transmit power to the second transmit power is transmitted to a reception device of the second transmit power by using at least one piece of the following signaling or information: radio resource control (RRC) signaling, system information (SI), sidelink control information (SCI), or downlink control information (DCI).

Supplement 29. A sidelink resource multiplexing method, including:
performing transmission and/or reception of sidelink information by a second device with a first device in a slot;
wherein, the slot at least includes a first part and a second part, the first part in the slot being configured with a first demodulation reference signal, and the second part in the timeslot being configured with a second demodulation reference signal.

Supplement 30. The method according to supplement 29, wherein the first demodulation reference signal and/or the second demodulation reference signal is/are configured or preconfigured or predefined as being related to a time-frequency resource or a group of time-frequency resources, the time-frequency resource(s) containing one or more slots in time domain, and containing one or more resource blocks in frequency domain.

Supplement 31. The method according to supplement 30, wherein the time-frequency resource(s) is/are configured by at least one of the following: radio resource control (RRC) signaling, system information (SI), sidelink control information (SCI), or downlink control information (DCI).

Supplement 32. The method according to supplement 30 or 31, wherein the time-frequency resource(s) include(s) at least one of the following: a reception resource pool, a transmission resource pool, a bandwidth part (BWP), a carrier, or a component carrier.

Supplement 33. A sidelink resource multiplexing method, including:
performing transmission and/or reception of sidelink information by a second device with a first device in a slot;
wherein, in a case where at least two types of transmit power are needed in the slot, a maximum transmit power in the at least two types of transmit power is taken as the transmit power of the slot.

Supplement 34. The method according to supplement 33, wherein the at least two types of transmit power includes a first transmit power taken as the maximum transmit power and a second transmit power less than the maximum transmit power.

Supplement 35. The method according to supplement 34, wherein for the second transmit power, information associated with the second transmit power is transmitted in a phase modulation manner.

Supplement 36. The method according to supplement 35, wherein the phase modulation manner is indicated by sidelink control information (SCI).

Supplement 37. The method according to supplement 34, wherein the first transmit power is transmitted to a reception device of the second transmit power by using at least one of the following signaling or information: radio resource control (RRC) signaling, system information (SI), sidelink control information (SCI), or downlink control information (DCI).

Supplement 38. The method according to supplement 34, wherein a difference between the first transmit power and the second transmit power or a ratio of the first transmit power to the second transmit power is transmitted to a reception device of the second transmit power by using at least one of the following signaling or information: radio resource control (RRC) signaling, system information (SI), sidelink control information (SCI), or downlink control information (DCI).

Supplement 39. A sidelink resource indication method, including:
transmitting length information indicating a length of a first part in a slot by a terminal equipment or a network device to a second device;
wherein the length information is used by the second device in performing transmission and/or reception of sidelink information with a first device.

Supplement 40. The method according to supplement 39, wherein, the length information is used by the second device to perform automatic gain control on the first part.

Supplement 41. The method according to supplement 39 or 40, wherein the length information includes at least one of the following: a length of a physical sidelink feedback channel, a slot length to which a numerology corresponds, or a length of a mini-slot.

Supplement 42. The method according to any one of supplements 39-41, wherein the sidelink information includes information carried by at least one of the following channels: a physical sidelink control channel, a physical sidelink shared channel, or a physical sidelink feedback channel.

Supplement 43. The method according to any one of supplements 39-42, wherein when there exist at least two lengths of the first parts in a time range overlapping in time with the slot, the at least two lengths of the first parts are configured as being identical.

Supplement 44. The method according to any one of supplements 39-43, wherein the length information is configured by at least one of the following: radio resource control (RRC) signaling, system information (SI), sidelink control information (SCI), or downlink control information (DCI).

Supplement 45. The method according to supplement 44, wherein a cyclic redundancy check (CRC) code of the sidelink control information is scrambled by using a common identifier.

Supplement 46. The method according to supplement 45, wherein the sidelink control information indicates at least one of the following: a length of a physical sidelink feedback channel, a slot at which a physical sidelink feedback channel is present, a symbol where a physical sidelink feedback channel is located, a resource block where a physical sidelink feedback channel is located, a slot at which a physical sidelink shared channel is present, a symbol where a physical sidelink shared channel is located, or a resource block where a physical sidelink shared channel is located.

Supplement 47. The method according to supplement 44, wherein in a slot, when first length information configured by the sidelink control information (SCI) and/or the downlink control information (DCI) is different from a second length information configured by the radio resource control (RRC) signaling and/or the system information (SI), length information of the slot is determined as the first length information.

Supplement 48. The method according to any one of supplements 39-47, wherein the length information is configured or preconfigured or predefined as being related to a time-frequency resource or a group of time-frequency resources, the time-frequency resource(s) containing one or more slots in the time domain, and containing one or more resource blocks in the frequency domain.

Supplement 49. The method according to supplement 48, wherein the time-frequency resource(s) is/are configured by at least one of the following: radio resource control (RRC) signaling, system information, sidelink control information, or downlink control information.

Supplement 50. The method according to supplement 48 or 49, wherein the time-frequency resource(s) include(s) at least one of the following: a reception resource pool, a transmission resource pool, a bandwidth part, a carrier, or a component carrier.

Supplement 51. The method according to any one of supplements 39-44, wherein the length information is predefined.

Supplement 52. The method according to any one of supplements 39-51, wherein one or more symbols preceding the first part in the slot carry/carries information used for the automatic gain control.

Supplement 53. The method according to supplement 52, wherein one or more symbols preceding the first part in the slot is/are taken as guard interval(s).

Supplement 54. The method according to any one of supplements 39-51, wherein a symbol preceding the first part in the slot carries information used for the automatic gain control and is taken as a guard interval.

Supplement 55. The method according to any one of supplements 39-54, wherein the slot at least further includes a second part, and one or more symbols preceding the second part in the slot carry/carries information used for the automatic gain control and/or is/are taken as guard interval(s).

Supplement 56. The method according to supplement 55, wherein the second part is a physical sidelink control channel and/or a physical sidelink shared channel.

Supplement 57. The method according to any one of supplements 39-56, wherein the first part in the slot is configured with a first demodulation reference signal, and another part in the slot is at least configured with a second demodulation reference signal.

Supplement 58. The method according to supplement 57, wherein the first demodulation reference signal and/or the second demodulation reference signal is/are configured or preconfigured or predefined as being related to a time-frequency resource or a group of time-frequency resources, the time-frequency resource(s) containing one or more slots in time domain, and containing one or more resource blocks in frequency domain.

Supplement 59. The method according to supplement 58, wherein the time-frequency resource(s) is/are configured by at least one of the following: radio resource control (RRC) signaling, system information (SI), sidelink control information (SCI), or downlink control information (DCI).

Supplement 60. The method according to supplement 58 or 59, wherein the time-frequency resource(s) include(s) at least one of the following: a reception resource pool, a transmission resource pool, a bandwidth part, a carrier, or a component carrier.

Supplement 61. The method according to any one of supplements 39-60, wherein, in a case where at least two types of transmit power are needed in the slot, a maximum transmit power in the at least two types of transmit power is taken as the transmit power of the slot.

Supplement 62. A terminal equipment, including a memory and a processor, the memory storing a computer program, and the processor being configured to execute the computer program to carry out the sidelink resource multiplexing method as described in any one of supplements 1-38 or the resource indication method as described in any one of supplements 39-61.

Supplement 63. A network device, including a memory and a processor, the memory storing a computer program, and the processor being configured to execute the computer program to carry out the resource indication method as described in any one of supplements 39-61.

What is claimed is:

1. A sidelink resource multiplexing apparatus, comprising:
    a memory that stores a plurality of instructions; and
    a processor coupled to the memory and configured to execute the instructions to:
        perform transmission and/or reception of physical sidelink feedback channel (PSFCH), and perform transmission and/or reception of physical sidelink control channel (PSCCH) and/or physical sidelink shared channel (PSSCH); and
    multiplex PSFCH and PSCCH/PSSCH in a predefined time division multiplexing (TDM) manner, wherein the predefined time division multiplexing (TDM) manner comprises when PSFCH of a first terminal device and PSFCH of a second terminal device are in the same slot, PSFCH durations are the same.

2. The apparatus according to claim 1, wherein a terminal device with ACK/NACK disabled acquires a PSFCH duration of a terminal device with ACK/NACK enabled, and performs transmission and/or reception of PSCCH/PSSCH according to the PSFCH duration.

3. The apparatus according to claim 1, wherein the processor is further configured to acquire length information indicating a length of a first part in a slot, and perform automatic gain control on the first part according to the length information.

4. The apparatus according to claim 3, wherein the length information comprises at least one of the following: a length of a physical sidelink feedback channel, a slot length to which a numerology corresponds, or a length of a mini-slot.

5. The apparatus according to claim 3, wherein the length information is configured by at least one of the following: radio resource control signaling, system information, sidelink control information, or downlink control information.

6. The apparatus according to claim 5, wherein a cyclic redundancy check code of sidelink control information is scrambled by using a common identifier;
    and the sidelink control information indicates at least one of the following: a length of a physical sidelink feedback channel, a slot at which a physical sidelink feedback channel is present, a symbol where a physical sidelink feedback channel is located, a resource block where a physical sidelink feedback channel is located, a slot at which a physical sidelink shared channel is present, a symbol where a physical sidelink shared channel is located, or a resource block where a physical sidelink shared channel is located.

7. The apparatus according to claim 3, wherein one or more symbols preceding the first part in the slot carry/carries information used for the automatic gain control, and one or more symbols preceding the first part in the slot is/are taken as guard interval(s).

8. The apparatus according to claim 3, wherein the slot at least further comprises a second part, and one or more symbols preceding the second part in the slot carry/carries information used for the automatic gain control and/or is/are taken as guard interval(s).

9. The apparatus according to claim 3, wherein the first part in the slot is configured with a first demodulation reference signal, and another part in the slot is at least configured with a second demodulation reference signal.

10. The apparatus according to claim 9, wherein the first demodulation reference signal and/or the second demodulation reference signal is/are configured or preconfigured or predefined as being related to a time-frequency resource or a group of time-frequency resources, the time-frequency resource(s) containing one or more slots in time domain, and containing one or more resource blocks in frequency domain.

11. The apparatus according to claim 10, wherein the time-frequency resource(s) is/are configured by at least one of the following: radio resource control signaling, system information, sidelink control information, or downlink control information.

12. The apparatus according to claim 10, wherein the time-frequency resource(s) comprise(s) at least one of the following: a reception resource pool, a transmission resource pool, a bandwidth part, a carrier, or a component carrier.

13. The apparatus according to claim 1, wherein a PSFCH duration and/or a PSFCH slot are/is configured or preconfigured or predefined as being related to a time-frequency resource or a group of time-frequency resources, the time-frequency resource(s) containing one or more slots in time domain, and containing one or more resource blocks in frequency domain.

14. The apparatus according to claim 13, wherein the time-frequency resource(s) is/are configured by at least one of the following: radio resource control signaling, system information, sidelink control information, or downlink control information.

15. The apparatus according to claim 13, wherein the time-frequency resource(s) comprise(s) at least one of the following: a reception resource pool, a transmission resource pool, a bandwidth part, a carrier, or a component carrier.

16. The apparatus according to claim 1, wherein a PSFCH duration is predefined.

17. The apparatus according to claim 1, wherein in a case where at least two types of transmit power are needed in a slot, a maximum transmit power in the at least two types of transmit power is taken as the transmit power of the slot.

18. A sidelink resource multiplexing method, comprising:
    performing, by a terminal device, transmission and/or reception of physical sidelink feedback channel (PSFCH), and performing transmission and/or reception of physical sidelink control channel (PSCCH) and/or physical sidelink shared channel (PSSCH); and
    multiplexing PSFCH and PSCCH/PSSCH in a predefined time division multiplexing (TDM) manner, wherein the predefined time division multiplexing (TDM) manner comprises when PSFCH of a first terminal device and PSFCH of a second terminal device are in the same slot, PSFCH durations are the same.

19. A communication system, comprising:
    a terminal device configured to:
        perform transmission and/or reception of physical sidelink feedback channel (PSFCH), and perform transmission and/or reception of physical sidelink control channel (PSCCH) and/or physical sidelink shared channel (PSSCH); and
    multiplex PSFCH and PSCCH/PSSCH in a predefined time division multiplexing (TDM) manner, wherein the predefined time division multiplexing (TDM) manner comprises when PSFCH of a first terminal device and PSFCH of a second terminal device are in the same slot, PSFCH durations are the same.

* * * * *